(12) United States Patent
Yamashita et al.

(10) Patent No.: US 7,380,969 B2
(45) Date of Patent: Jun. 3, 2008

(54) PLANAR LIGHT SOURCE SYSTEM AND LIGHT DEFLECTING DEVICE THEREFOR

(75) Inventors: Tomoyoshi Yamashita, Kanagawa (JP); Yasuko Hayashi, Kanagawa (JP); Issei Chiba, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 502 days.

(21) Appl. No.: 10/617,805

(22) Filed: Jul. 14, 2003

(65) Prior Publication Data
US 2004/0012945 A1 Jan. 22, 2004

Related U.S. Application Data

(63) Continuation of application No. 10/013,671, filed on Dec. 13, 2001, now Pat. No. 6,669,350.

(30) Foreign Application Priority Data
Dec. 14, 2000 (JP) ............................. 2000-380893
Oct. 5, 2001 (JP) ............................. 2001-310123

(51) Int. Cl.
*F21V 8/00* (2006.01)
(52) U.S. Cl. ...................... 362/612; 362/621; 362/331
(58) Field of Classification Search ................ 362/617, 362/621, 623, 625, 626, 612, 616, 331, 339
See application file for complete search history.

(56) References Cited

U.S. PATENT DOCUMENTS 6,254,246 B1 * 7/2001 Tiao et al. .................. 362/614
6,357,888 B1 * 3/2002 Takata et al. ............... 362/620
6,474,826 B1 * 11/2002 Tanaka et al. .............. 362/612
6,582,095 B1 * 6/2003 Toyoda ....................... 362/235
6,669,350 B2 * 12/2003 Yamashita et al. .......... 362/612
6,733,147 B2 * 5/2004 Wang et al. ................... 362/26

FOREIGN PATENT DOCUMENTS

| JP | 02-084618 A | 3/1990 |
|---|---|---|
| JP | 3-69174 U | 7/1991 |
| JP | 07-320514 | 12/1995 |
| JP | 07-320514 A | 12/1995 |
| JP | 08-184829 A | 7/1996 |
| JP | 08-320405 | 12/1996 |

(Continued)

*Primary Examiner*—Stephen F Husar
*Assistant Examiner*—Peggy A. Neils
(74) *Attorney, Agent, or Firm*—Morgan, Lewis & Bockius LLP

(57) ABSTRACT

A planar light source system having an LED (1) serving as a primary light source of substantially point-shaped light source, a light guide (2) having a light incident face on which light emitted from the LED (1) is incident and a light emission face (4) from which light guided through the light guide (2) is emitted, a light deflecting device (3) for controlling the direction of the emission light from the light guide (2), and a reflection sheet (6). LED (1) is disposed at a corner portion of the light guide (2), and many elongated prisms (5) are arranged substantially arcuately in parallel to each other on the light incident surface (14) of the light deflecting device (3) so as to surround LED (1).

7 Claims, 13 Drawing Sheets

FOREIGN PATENT DOCUMENTS

| | | |
|---|---|---|
| JP | 09-081048 A | 3/1997 |
| JP | WO97/17631 | 3/1997 |
| JP | 09-152360 A | 6/1997 |
| JP | 10-082915 | 3/1998 |
| JP | 11002730 A | 1/1999 |
| JP | 11-167028 A | 6/1999 |
| JP | 11-183729 A | 7/1999 |
| JP | 11-232918 A | 8/1999 |
| JP | 11-329039 A | 11/1999 |
| JP | 2000-100231 | 4/2000 |
| JP | 2000-250032 | 9/2000 |
| JP | 2001035222 A | 2/2001 |
| JP | 2001-133776 A | 5/2001 |
| JP | 2001-143512 A | 5/2001 |
| JP | 2001-215338 A | 8/2001 |

\* cited by examiner

FIG.23A
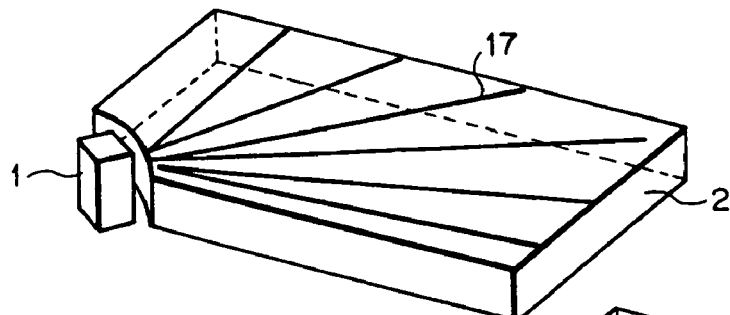
FIG.23B
FIG.23C
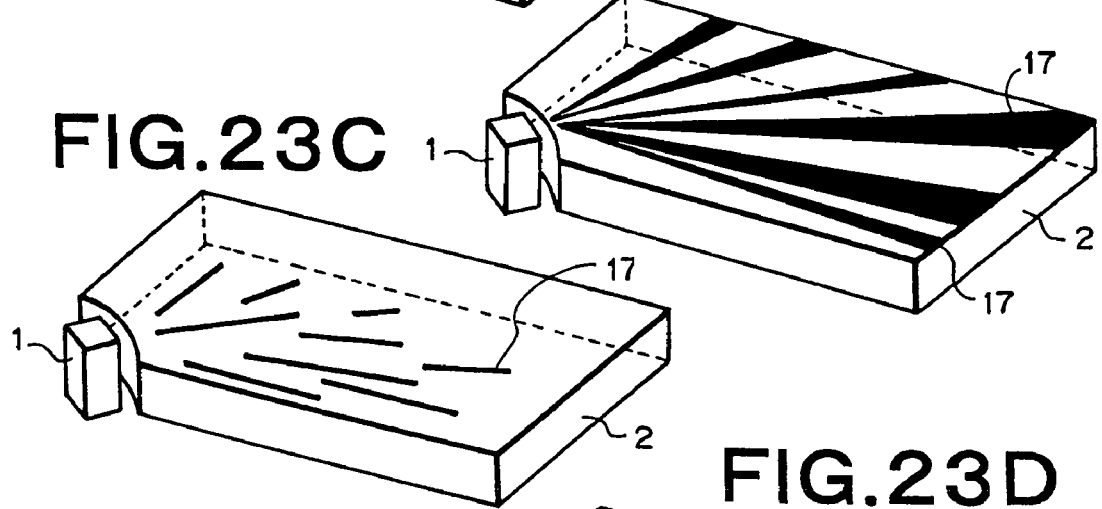
FIG.23D
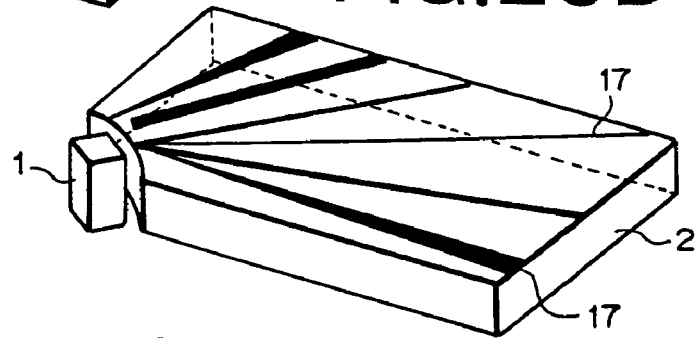
FIG.23E  FIG.23F
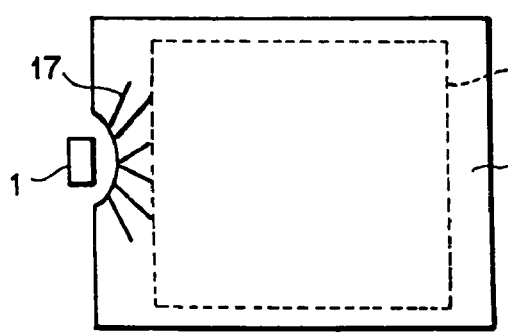
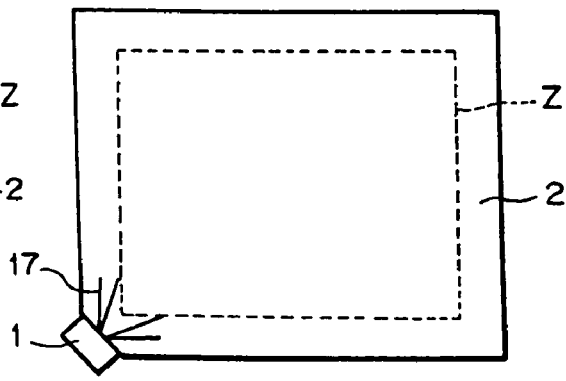

PLANAR LIGHT SOURCE SYSTEM AND LIGHT DEFLECTING DEVICE THEREFOR

This application is a Continuation patent application under 37 C.F.R. § 1.53(b), of prior application Ser. No. 10/013,671, filed on Dec. 13, 2001 now U.S. Pat. No. 6,669,350.

FIELD OF THE INVENTION

The present invention relates to a planar light source system using a substantially point-shaped light source such as an LED light source or the like used for a liquid crystal display device or the like, and particularly to a planar light source system which is used for mobile electronic equipment such as a cellular phone, a portable information terminal or personal digital assistant (PDA), an electronic organizer, a game machine, a note type personal computer or the like and is designed to be enhanced in miniaturization and reduced in power consumption, and a light deflecting device used therefor.

DESCRIPTION OF THE RELATED ART

Demands for mobile electronic equipment such as a cellular phone, a portable information terminal or personal digital assistant, an electronic organizer, a game machine, a note type personal computer, etc. has been recently enhanced, and a light source which is reduced in power consumption and designed to have a thin body and also provides high and uniform luminance has been required as a back light source for a liquid crystal display device for such a mobile electronic equipment.

An under-lighting type in which plural linear light sources such as fluorescent lamps or the like are arranged in a housing or an edge-lighting type in which a linear light source is disposed at a side end surface of a planar light guide has been hitherto known as a back light source device used for a liquid crystal display device, a signboard, a traffic direction board or the like. With respect to the under-lighting type back light source, it is difficult to reduce the weight of the light source portion and also reduce the thickness of the light source portion, and also there occurs a see-through phenomenon that fluorescent lamps or the like used as a light source are seen through a display panel.

Therefore, the edge-lighting type has been more frequently used as a light and thin back light source device. Such an edge-lighting type light source device is a planar light source system as described below. That is, according to the planar light source system, a plate-shaped transparent material such as an acrylic resin plate or the like is usually used as a light guide, and a light source is disposed so as to confront the side end surface of the light guide. Light emitted from the light source is introduced into the light guide through the side end surface (light incident face) thereof, and the light thus introduced into the light guide is emitted in a planar shape from a light emission face of the light guide by using a light emission function such as a light diffusing portion formed on a front surface (light emission face) or back surface of the light guide. The light thus emitted by the light emission function is generally emitted in a slant direction to the emission face of the light guide, and thus it is general that an emission direction controller such as a prism sheet or the like is mounted on the light guide to deflect the light in the normal direction of the light emission face of the light guide.

For example, JP(A)-2-84618 or JP(U)-3-69174 has proposed a planar light source system in which a directional light emission structure such as a mat-finished surface or the like is formed on at least one of the light emission face of the light guide and the back surface thereof and a prism sheet having many linear elongated prisms arranged in parallel to each other is mounted on the light emission face. In such a planar light source system, the distribution of the emission light excessively expands, particularly in the vertical and parallel directions (more particularly, in the parallel direction) to the light source, and thus it does not sufficiently satisfy the requirements for low power consumption and high luminance.

Besides, from the viewpoint of reduction in power consumption and miniaturization, an LED light source is being used in a planar light source system for mobile electronic equipment or the like. Such a planar light source system using an LED light source is disclosed in JP(A)-9-81048 or JP(A)-9-152360. According to the disclosure of the former publication, an LED light source is disposed at the side end surface of a light guide, and one of the main surfaces of the light guide is set to a mat-finished surface while linear elongated prisms extending linearly are disposed on the other surface in parallel to the light incident edge. Further, according to the disclosure of the latter publication, an LED light source is disposed at the bottom surface side of a light guide having a prism shape on the back surface thereof, and light incident from the bottom surface is guided with use of a mirror.

According to these planar light source systems described above, light is directed in the normal direction of the emission face of the light guide by the action of the prism shape provided to the light guide. However, since the linear prism extending straightly is formed in parallel to the light incident edge, light emitted from the LED light source in a slant direction cannot be directed in the normal direction of the light emission face of the light guide, so that an area located in the slant direction is dark and thus luminance unevenness occurs.

Furthermore, JP(A)-7-320514 proposes that an LED light source is disposed at the corner portion of a light guide and a diffusing light guide is used, and JP(A)-8-184829 discloses that both the surfaces of a light guide are roughened. However, according to these planar light source systems, light is emitted in a slant direction to the light emission face, and thus the luminance is lowered in the normal direction which is an usual observation direction.

Still furthermore, JP(A)-11-232918 and JP(A)-11-329039 proposes that a diffusion pattern is formed on the back surface of a light guide so that it is disposed discretely and arcuately with respect to a point light source. However, it is impossible for the formation of such a diffusion pattern to efficiently emit light propagating through the light guide in the normal direction of the light emission face of the light guide, so that sufficient luminance cannot be achieved.

Still furthermore, JP(A)-11-167028 or JP(A)-2001-143512 proposes that many elongated prisms or V-shaped grooves are concentrically formed on the front surface or back surface of a light guide with a point light source positioned at the center in a planar light source system using the point light source. By forming such a concentric pattern on the light guide, light can be emitted uniformly over the overall light emission face of the light guide to thereby suppress occurrence of luminance unevenness. However, according to these planar light source system, emission light from the light guide is emitted directly or through a light diffusion film, and the distribution of emission light from the planar light source system has low directionality, so that a planar light source system having high luminance cannot be achieved.

Besides, there is also proposed a planar light source system comprising a light guide having a light diffusion pattern such as a dot pattern or the like printed on a light emission face thereof, a light diffusion film disposed on the light emission face of the light guide, and two prism sheets disposed on the light diffusion film, wherein each of the prism sheets has many linear elongated prisms arranged in parallel to each other, each elongated prism having a right-angled isosceles triangular section, and two prism sheets are arranged so that the elongated prisms thereof are perpendicular to one another. However, according to this planar light source system, it is difficult to efficiently emit directional light emitted from an LED light source in the normal direction, and also the distribution of emission light is excessively expanded, so that the luminance in the normal direction and the light utilization efficiency are lowered.

SUMMARY OF THE INVENTION

Therefore, an object of the present invention is to provide a planar light source system which is suitably used as a planar light source system using a substantially point-shaped light source such as an LED light source or the like for use in a liquid crystal display device for mobile electronic equipment such as a cellular phone, a portable information terminal or personal digital assistant, an electronic organizer, a game machine, a note type personal computer or the like, and low in power consumption, compact in size, excellent in light utilization efficiency, high in luminance and excellent in luminance uniformity, and a light deflection device used in the planar light source system.

That is, according to the present invention, there is provided a planar light source system comprising at least one primary light source substantially point-shaped light source; a light guide having a light incident face on which light emitted from the primary light source is incident, guiding the incident light and having a light emission face from which the incident light is emitted; and a light deflecting device for controlling a direction of an emission light from the light guide, wherein the primary light source is disposed at a corner portion or an end surface of the light guide, and many substantially arc-shaped elongated lenses are formed in parallel to each other on at least one surface of the light deflecting device so as to surround the primary light source.

In an aspect of the present invention, the light deflecting device has a light indident surface which confronts the light guide, and the substantially arc-shaped elongated lenses are formed on at least the light incident surface. In an aspect of the present invention, each of the elongated lenses formed on the light deflecting device comprises an elongated prism having two prism faces, and light incident through at least one prism face is internally reflected and emitted from a light emission surface in a desired direction. In an aspect of the present invention, each elongated prism of the light deflecting device comprises two prism faces, one prism face being farther from the primary light source and another prism face being nearer to the primary light source, and an intersecting angle between the prism face farther from the primary light source and a reference plane of the light deflecting device is equal to 40 to 80 degrees.

In an aspect of the present invention, at least a part of at least one prism face constituting each elongated prism of the light deflecting device is designed to have a convex or concave curved-surface. In an aspect of the present invention, when there is assumed virtual elongated prisms arranged at the same pitch as an arrangement of the elongated prisms of the light deflecting device, each elongated prism having a triangular cross section with an apex angle of θ, and peak light in an emission light distribution of light emitted from the light emission face of the light guide being incident through one prism face, internally reflected by the other prism face and then emitted from the light emission surface in a desired direction, at least one prism face constituting each elongated prism of the light deflecting device is designed to have a convex curved-surface with respect to a shape of each of the virtual elongated prism. In an aspect of the present invention, the apex angle θ of the virtual elongated prisms is set so that the peak light is emitted within ±5 degrees relative to the normal direction of the light emission surface of the light deflecting device. In an aspect of the present invention, when there is assumed virtual elongated prisms arranged at the same pitch as an arrangement of the elongated prisms of the light deflecting device, each virtual elongated prism having a triangular cross section with an apex angle of θ, and peak light in an emission light distribution of light emitted from the light emission face of the light guide being incident through one prism face, internally reflected by the other prism face and then emitted from the light emission surface in a desired direction, at least one prism face constituting each elongated prism of the light deflecting device is designed to have a concave curved-surface with respect to a shape of each of the virtual elongated prism.

In an aspect of the present invention, the light deflecting device has elongated lenses formed on at least a light emission surface at the opposite side to a light incident surface confronting the light guide. In an aspect of the present invention, the light deflecting device refracts light incident through the light incident surface and emits the light from the light emission surface in a desired direction. In an aspect of the present invention, each elongated prism of the light deflecting device comprises two prism faces, one prism face being farther from the primary light source and another face being nearer to the primary light source, and an intersecting angle between the prism face farther from the primary light source and a reference plane of the light deflecting device is equal to 35 to 55 degrees while an intersecting angle between the prism face nearer to the primary light source and the reference plane of the light deflecting device is equal to 35 to 55 degrees.

In an aspect of the present invention, the light guide contains therein a structure having a refractive index different from that of the light guide. In an aspect of the present invention, the light guide has an uneven shape on at least one surface thereof. In an aspect of the present invention, an average slant angle of the uneven shape formed on the surface of the light guide is equal to 2 to 12 degrees. In an aspect of the present invention, the uneven shape formed on the surface of the light guide comprises many elongated lenses arranged in parallel to each other. In an aspect of the present invention, the many elongated lenses are disposed in a substantially arc-shaped arrangement so as to surround the primary light source. In an aspect of the present invention, the elongated lenses are discretely arranged with a flat portion interposed between neighboring elongated lenses. In an aspect of the present invention, a ratio of the lens portion to the flat portion is varied. In an aspect of the present invention, the ratio of the lens portion to the flat portion is increased as the distance from the primary light source is increased. In an aspect of the present invention, the ratio of the lens portion to the flat portion is varied in a circumferential direction of an arc shape surrounding the primary light source. In an aspect of the present invention, the uneven shape formed on the surface of the light guide is a roughened surface. In an aspect of the present invention, the light guide has uneven grooves on the opposite surface to the surface on which the uneven shape is formed so that the uneven grooves extend in a radial direction with the primary light source positioned substantially at the center.

According to the present invention, there is also provided a light deflecting device for a planar light source system, wherein the light deflecting device is designed in a rectangular shape and has many elongated lenses arranged in parallel to each other on at least one surface thereof, the elongated lenses extend substantially arcuately with a corner portion or one point of an end surface of the light deflecting device positioned substantially at the center of an arc.

In an aspect of the present invention, the elongated lenses are formed on at least a light incident surface thereof. In an aspect of the present invention, each of the elongated lenses comprises an elongated prism having two prism faces, and light incident through at least one prism face is internally reflected and emitted from a light emission surface in a desired direction. In an aspect of the present invention, each of the elongated prisms comprises two prism faces, one of which is located at a farther position from the center of the arc and the other of which is located at a nearer position to the center of the arc, and an intersecting angle between the prism face located at the farther position from the center of the arc and a reference plane of the light deflecting device is equal to 40 to 80 degrees.

In an aspect of the present invention, at least a part of at least one prism face constituting each of the elongated prisms is designed to have a convex or concave curved-surface shape. In an aspect of the present invention, when there is assumed virtual elongated prisms arranged at the same pitch as an arrangement of the longated prisms, each virtual elongated prism having a triangular cross section with an apex angle of θ, and peak light in a distribution of light incident through the light incident surface being incident on one prism face, internally reflected by the other prism face and then emitted from the light emission surface in a desired direction, at least one prism surface constituting each of the elongated prisms is designed to have a convex curved-surface with respect to a shape of each of the virtual elongated prism. In an aspect of the present invention, the apex angle θ of the virtual elongated prisms is set so that the peak light is emitted within ±5 degrees relative to the normal direction of the light emission surface of the light deflecting device. In an aspect of the present invention, when there is assumed virtual elongated prisms arranged at the same pitch as an arrangement of the elongated prisms, each virtual elongated prism having a triangular cross section with an apex angle of θ, and peak light in a distribution of light incident through the light incident surface being incident on one prism face, internally reflected by the other prism face and then emitted from the light emission surface in a desired direction, at least one prism surface constituting each of the elongated prisms is designed to have a concave curved-surface with respect to a shape of each of the virtual elongated prism.

In an aspect of the present invention, the elongated lenses are formed on at least a light emission surface at the opposite side to a light incident surface. In an aspect of the present invention, light incident through the light incident surface is refracted and emitted in a desired direction from the light emission surface. In an aspect of the present invention, each of the elongated prisms comprises two prism faces, one prism face being farther from the center of the arc and the other face being nearer to the center of the arc, and an intersecting angle between the prism face farther from the center of the arc and a reference plane of the light deflecting device is equal to 35 to 55 degrees while an intersecting angle between the prism face nearer to the center of the arc and the reference plane of the light deflecting device is equal to 35 to 55 degrees.

BRIEF DESCRIPTION OF THE DRAWINGS

FIG. 23A is a diagram showing an embodiment of a pattern of elongated prisms of a light guide according to the present invention on which radially elongated prisms are formed;

FIG. 23B is a diagram showing an embodiment of a pattern of elongated prisms of a light guide according to the present invention on which radially elongated prisms are formed;

FIG. 23C is a diagram showing an embodiment of a pattern of elongated prisms of a light guide according to the present invention on which radially elongated prisms are formed;

FIG. 23D is a diagram showing an embodiment of a pattern of elongated prisms of a light guide according to the present invention on which radially elongated prisms are formed;

FIG. 23E is a diagram showing an embodiment of a pattern of elongated prisms of a light guide according to the present invention on which radially elongated prisms are formed;

FIG. 23F is a diagram showing an embodiment of a pattern of elongated prisms of a light guide according to the present invention on which radially elongated prisms are formed;

DETAILED DESCRIPTION OF PREFERRED EMBODIMENTS

Preferred embodiments according to the present invention will be described hereunder in detail with reference to the accompanying drawings.

Figure 1:
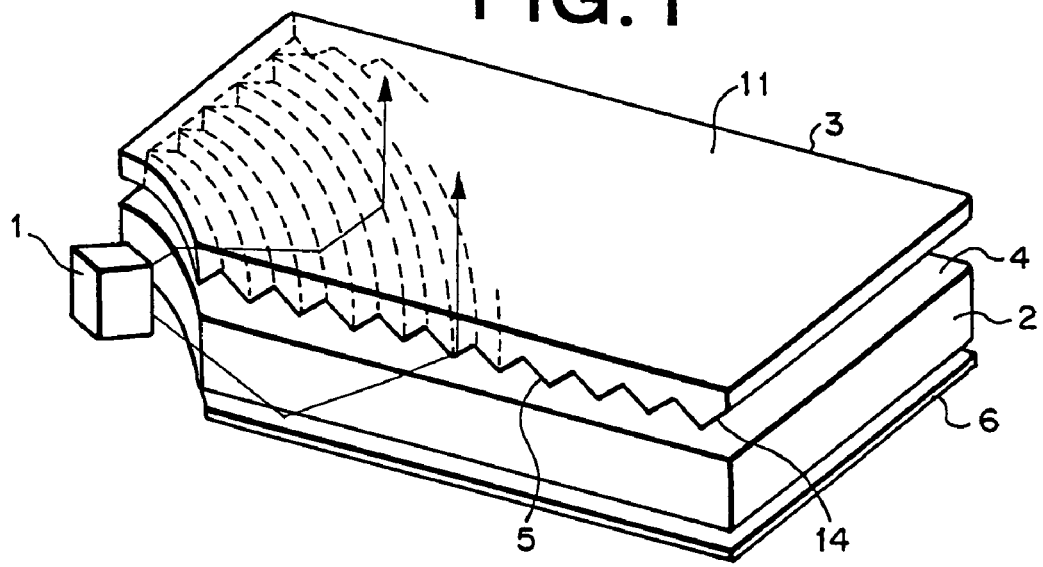
FIG. 1 is a diagram showing the basic construction of a planar light source system according to the present invention.

FIG. 1 shows an embodiment of a planar light source system according to the present invention. In FIG. 1, an LED light source 1 is used as a primary light source of substantially point-shaped light source, and it is disposed at a corer portion of a light guide 2. The corner portion of the light guide 2 at which the primary light source 1 is disposed is notched in an arc shape, and the light guide 2 has an undermentioned directional light emitting structure on a light emission face 4 thereof or the back surface thereof at the opposite side of the light emission face. A light deflecting device 3 is mounted on the light emission face 4 of the light guide 2. The light deflecting device 3 has many arc-shaped elongated prisms 5 on a light incident surface 14 thereof which confronts the light emission face 4 of the light guide 2. The arc-shaped elongated prisms 5 are arranged in parallel to each other on the light incident surface 14 so as to surround the primary light source 1. Further, a light reflection sheet 6 is disposed on the back surface of the light guide 2 at the opposite side to the optical emission face 4.

Light emitted from the primary light source 1 is incident on the light incident face of the light guide 2 so as to be introduced into the light guide 2, propagates through the light guide 2 while being repetitively reflected in the light guide 2 and then is emitted from the light emission face 4 by the directional light emitting structure formed on the light guide 2. According to the present invention, light having directionality in a distribution within a plane which is parallel to the propagation direction of light and perpendicular to the light emission face 4 is emitted from the light emission face 4 by providing at least one of the light emission face 4 of the light guide 2 and the back surface thereof with a directional light emitting structure formed of a roughened surface, with a directional light emitting structure formed of a lens face which comprises many elongated lenses such as elongated prisms, lenticular lenses, V-shaped grooves or the like in parallel to each other, or with directional light emitting structure formed by dispersing light diffusion fine particles in the light guide 2.

The directional emission light emitted from the light emission face 4 of the light guide 2 is incident on the light incident surface 14 of the light deflecting device 3, reflected or refracted by the elongated lenses 5, and emitted, for example, in the normal direction of the light emission face 4 of the light guide 2. In this embodiment, since the elongated prisms 5 each having a substantially triangular cross section are formed on the light incident surface 14 of the light deflecting device 3, the directional emission light emitted from the light emission face 4 of the light guide 2 is incident on one prism face of each elongated prism 5, internally reflected (preferably internally totally reflected) by the other prism face to be deflected in a desired direction, and then emitted from a light emission surface 11.

Further, according to the present invention, since a substantially point-shaped light source such as an LED light source or the like is used as the primary light source 1, the light incident into the light guide 2 propagates in a radial direction within the same plane as the light emission face 4 with the primary light source 1 positioned at the center, and the emission light emitted from the light emission face 4 is likewise emitted in a radial direction with the primary light source 1 positioned at the center thereof. According to the present invention, in order to efficiently deflect the emission light thus radially emitted in a desired direction, the elongated prisms 5 formed on the light deflecting device 3 are arranged arcuately in parallel to each other so as to surround the primary light source 1. By arranging the elongated prisms 5 arcuately in parallel to each other so as to surround the primary light source 1 as described above, most of the light emitted in the radial direction from the light emission face 4 is incident in a perpendicular direction to the substantial arc shape of the elongated prisms 5 of the light deflecting device 3, so that the emission light can be efficiently directed in a specific direction in the overall area of the light emission face 4 of the light guide 2 and thus uniformity of luminance can be enhanced.

The degree of the arc of the substantially arc-shaped elongated prisms 5 formed on the light deflecting device 3 is selected in accordance with the distribution of light propagating through the light guide 2, and it is preferable to select the degree of the arc so that most of light emitted from the light emission face 4 in the radial direction is incident in the perpendicular direction to the elongated prisms 5 of the light deflecting device 3. Specifically, the arc-shaped elongated prisms 5 may be concentrically arranged in parallel to each other so that the radius of the arc of elongated prisms is increased little by little as the distance from the point-shaped light source such as an LED positioned in the center of the arc increases. The range of the radius of the elongated prisms is determined by the positional relationship between the position of the point-shaped light source in the planar light source system and the effective area of the planar light source corresponding to a display area of liquid crystal display device or the size of the effective area.

The pattern of the elongated prisms 5 formed on the light deflecting device 3 of the present invention may be suitably set in accordance with the arrangement of the primary light source 1 as shown in FIGS. 2 to 5, 6A, 6B, for example. Arrows in the figures represent directions in which the light from the primary light source 1 propagates in the light guide 2. In any case, it is preferable that the elongated prisms 5 are arranged in such a pattern that most of light emitted from the light emission face 4 in the radial direction can be incident substantially in the perpendicular direction to the elongated prisms 5 of the light deflecting device 3.

Figure 2:
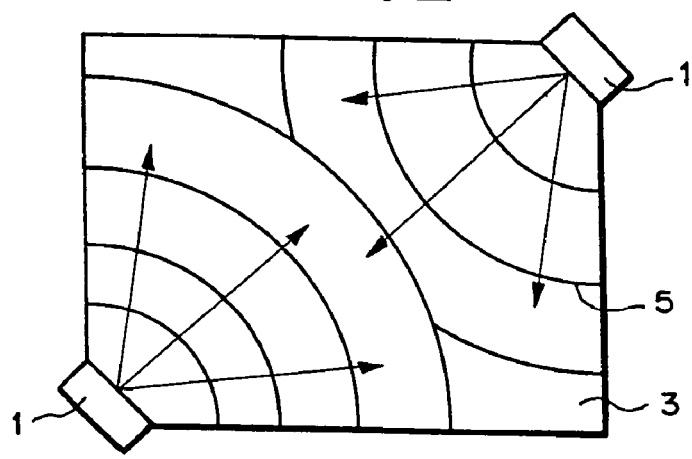
FIG. 2 is a diagram showing an embodiment of a pattern of elongated prisms of a light deflecting device according to the present invention.

FIG. 2 shows a case where plural primary light sources 1 are arranged at two corner portions corresponding to the diagonal positions of the light guide 2. Two groups of arc-shaped elongated prisms 5 each of which contains arc-shaped elongated prisms arranged arcuately with each primary light source 1 positioned substantially at the center of the arc are arranged substantially symmetrically with respect to the boundary corresponding to the line which is away from both the light incident faces at the same distance.

Figure 3:
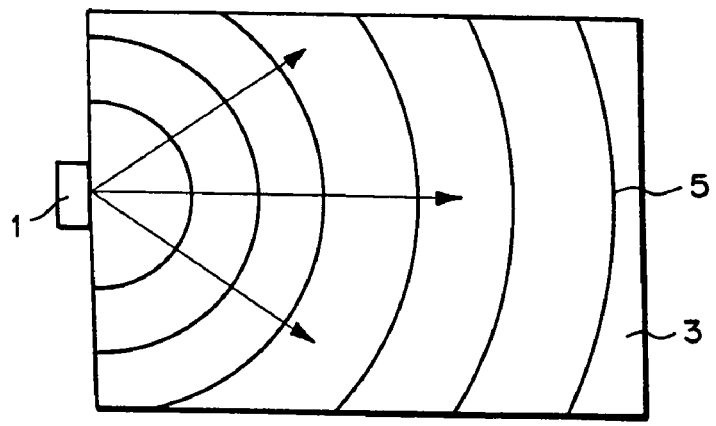
FIG. 3 is a diagram showing an embodiment of a pattern of elongated prisms of a light deflecting device according to the present invention.

FIG. 3 shows a case where a primary light source 1 is disposed at the center of one end surface of the light guide 2, and the elongated prisms 5 are arranged so as to cross the lines extending in the radial direction from the primary light source 1 substantially in the perpendicular direction and surround the primary light source arcuately.

Figure 4:
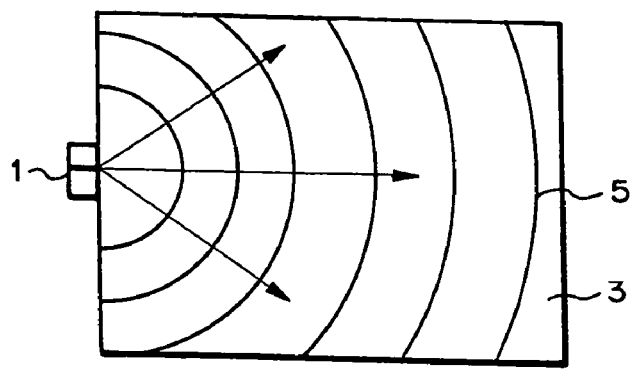
FIG. 4 is a diagram showing an embodiment of a pattern of elongated prisms of a light deflecting device according to the present invention.

FIG. 4 shows a case where a primary light source 1 having two point-shaped light sources arranged at the center of one end surface of the light guide 2 so as to be close to each other is used. In this case, the elongated prisms 5 are formed so as to cross substantially in the perpendicular direction to the lines extending in the radial direction from the center point between the two point-shaped light sources and surround the primary light source 1 arcuately.

Figure 5:
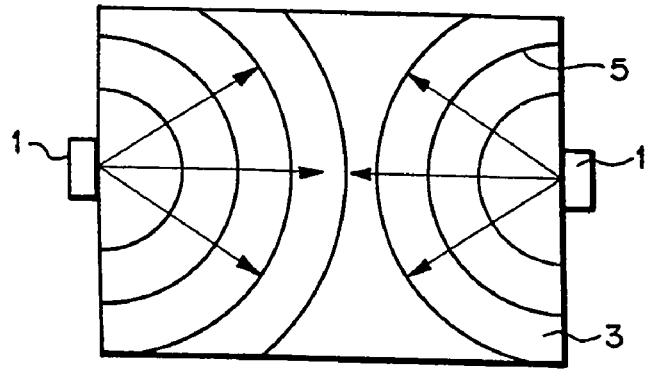
FIG. 5 is a diagram showing an embodiment of a pattern of elongated prisms of a light deflecting device according to the present invention.

FIG. 5 shows a case where two primary light sources 1 are disposed at the center positions of two confronting end surfaces of the light guide 2. In this case, two groups of arc-shaped elongated prisms 5 which are arranged so as to surround the respective primary light sources 1 positioned at the center are formed so as to be symmetrical with respect to the center line of the light guide 2.

Figure 6A:
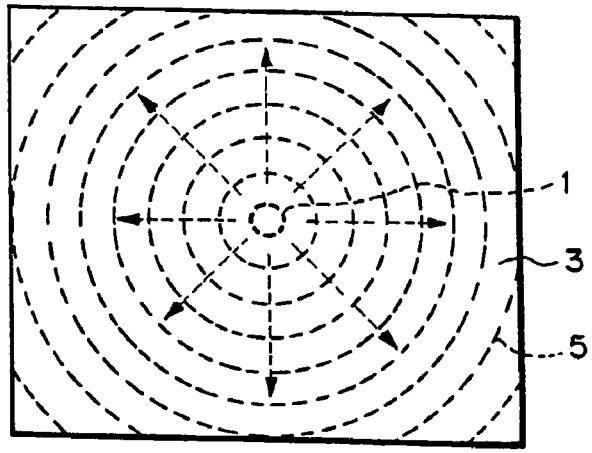
FIG. 6A is a plan view showing an embodiment of a pattern of elongated prisms of a light deflecting device according to the present invention.
Figure 6B:
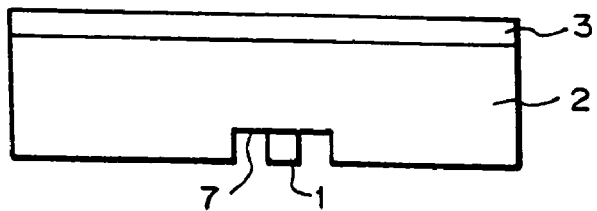
FIG. 6B is a cross-sectional view of FIG. 6A.

FIGS. 6A and 6B show a case where a primary light source 1 is disposed through air, resin or transparent material in a recess portion 7 formed at the center portion of the back surface of the light guide 2, and the elongated prisms 5 are formed arcuately around the primary light source 1. The recess portion 7 formed on the back surface of the light guide 2 may a through hole penetrating from the back surface to the light emission face 4.

In the present invention, the elongated prisms 5 formed on the light deflecting device 3 may be formed on the light incident surface 14 of the light deflecting device 3 so as to confront the light emission face 4 or on the light emission surface 11 of the light deflecting device 3. First, a case where the elongated prisms 5 are formed on the light incident surface of the light deflecting device 3 are formed will be described with reference to FIG. 7.

Figure 7:
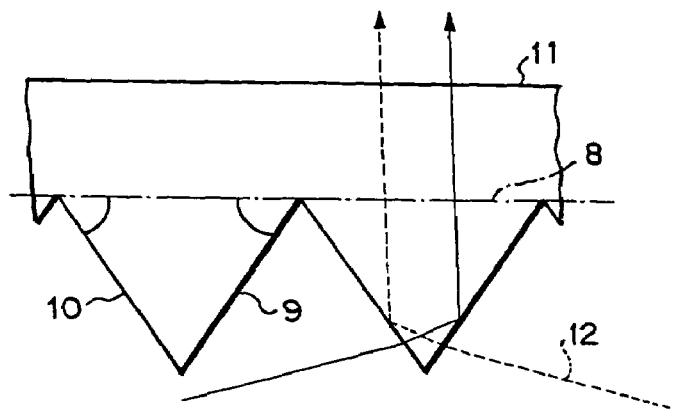
FIG. 7 is a diagram showing the shape of a prism unit of an embodiment of a light deflecting device according to the present invention.

As shown in FIG. 7, emission light (solid line arrow) emitted from the light emission face 4 of the light guide 2 is incident into the light deflecting device 3 on the faces 10 of the elongated prisms 5 which are nearer to the primary light source 1, internally reflected from the faces 9 of the elongated prisms 5 which are farther from the primary light source 1, thereby deflecting the light in a desired direction, and then emitted from the light emission surface 11 of the light deflecting device 3. Therefore, the emission direction of the emission light emitted from the light emission face 4 of the light guide 2 can be varied to a desired direction while the directionality of the emission light is substantially kept. Therefore, there can be achieved a planar light source system having a high light utilization efficiency and high luminance.

Since the peak light of the emission light distribution of the emission light emitted from the light emission face 4 of the light guide 2 is inclined with respect to the light emission face 4 by 10 to 50 degrees, the intersecting angle between each prism face 9 farther from the primary light source 1 and the reference plane 8 of the light deflecting device 3 is preferably set in the range from 40 to 80 degrees, and more preferably in the range from 50 to 65 degrees, and still more preferably in the range from 55 to 65 degrees. This is because if the intersecting angle between each prism face 9 farther from the primary light source 1 and the reference plane 8 of the light deflecting device 3 is set to a value in this range, the emission light having the directionality from the light guide 2 can be emitted substantially in the normal direction of the light emission surface 11 of the light deflecting device 3. Here, the reference plane 8 of the light deflecting device 3 is a plane on the assumption that the surface on which the elongated prisms 5 of the light deflecting device 3 are formed is smooth.

A part of the light propagating through the light guide 2 reaches the end portion of the light guide 2 and then is reflected and returned from the end surface thereof. Such a light propagates through the light guide 2 toward the light incident face and then is emitted from the light emission face 4 by the directional light emitting structure formed on the light guide 2 to cause an emission light 12 (dotted line arrow). Such an emission light 12 is incident on the prism face 9 farther from the primary light source 1 of the light deflecting device 3, internally reflected from the prism face 10 nearer to the primary light source 1 to be deflected into a desired direction, and then emitted from the light emission surface 11 of the light deflecting device 3. The peak light of the emission light distribution of such a light is inclined with respect to the light emission face 4 by 10 to 50 degrees, and thus when such an emission light is relatively much, the intersecting angle between the prism face 10 of each elongated prism 5 nearer to the primary light source 1 and the reference plane 8 of the light deflecting device 3 is preferably set in the range from 40 to 80 degrees, more preferably in the range from 50 to 65 degrees, still more preferably in the range from 55 to 65 degrees as in the case of the prism face 9 farther from the primary light source 1.

The intersecting angle between each prism face 9 and the reference plane 8 of the light deflecting device 3 and the intersecting angle between each prism face 10 and the reference plane 8 may be set to be equal to each other or different from each other. When both the intersecting angles are set to be different from each other, the difference in the intersecting angle is preferably equal to 10 degrees or less, more preferably to 5 degrees or less and still more preferably to 2 degrees or less.

Figure 8:
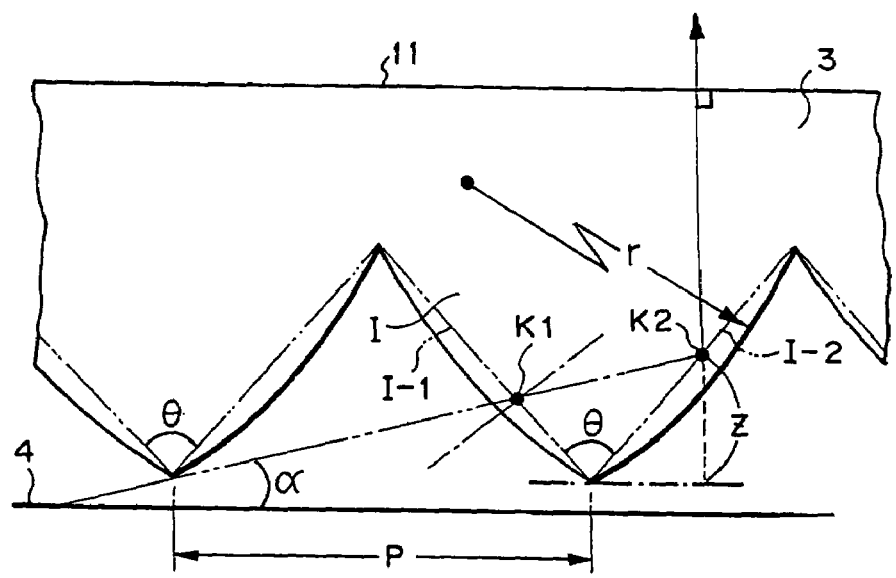
FIG. 8 is a diagram showing the shape of a prism unit of an embodiment of a light deflecting device according to the present invention.

According to the present invention, in an application field such as an application to a planar light source system for portable electronic equipment such as a cellular phone, a portable information terminal or the like which is strongly required to be reduced in power consumption and increased in luminance, the cross-sectional shape of the elongated prisms 5 formed on the light deflecting device 3 is designed so that the prism face of each elongated prism 5 is set to a convex curved-surface shape as shown in FIG. 8, thereby deflecting light concentratedly in a desired direction when the light is internally reflected from the prism face. Therefore, the light is emitted as concentrated light having higher directionality and the luminance per power consumption can be enhanced, so that the power consumption can be more greatly reduced and the luminance can be more enhanced.

The shape of the elongated prisms 5 will be described with reference to FIG. 8. First, the pitch of the elongated prism arrangement is represented by P and a virtual elongated prism I having a triangular cross section is set. The intersecting angle between two prism faces I-1, I-2 of the virtual elongated prism I (that is, the apex angle of the virtual prism) is represented by θ. The angle θ of the virtual elongated prism I is set so that the peak emission light (angle of inclination: α) of an intensity distribution of light coming from the light emission face 4 of the light guide 2 is incident to the virtual elongated prism I and internally reflected (preferably internally totally reflected) from the virtual prism face I-2, and then deflects, for example, in the normal direction of the light emission surface 11.

Next, on the basis of the shape of the virtual elongated prism I which is set as described above, the shape of the actual elongated prism is set so that at least prism face thereof has a convex curved-surface shape. Specifically, it is preferable that the shape of the actual elongated prism is set as follows.

Virtual light is set on the assumption that the peak emission light (angle of inclination: α) of the emission light distribution of the light emitted from the light emission face 4 of the light guide 2 goes past the apex portion of a neighboring virtual elongated prism at the primary light source side and incident to the virtual prism I. The position at which this virtual light passes through the virtual prism face I-1 is represented by K1, and the position at which the virtual light reaches the virtual prism face I-2 is represented by K2. In this case, the shape of the actual elongated prism is preferably set to such a convex curved-surface shape that a part or the whole of the prism face of the actual elongated prism has an inclination angle larger than the inclination angle of the prism face I-2 of the virtual elongated prism I in an area which is nearer to the light emission surface 11 than the internal total reflection position K2 of the prism face I-2 of the virtual elongated prism I.

This means that the actual prism face has a larger inclination angle than that of the prism face I-2 of the virtual elongated prism I represented by the following equation (2) in any position in the normal direction of the light emission face at which the dimension z of FIG. 8 (the distance in the normal direction of the light emission surface 11 between the apex point of the elongated prism and the internal reflection position K2 of the virtual prism face I-2) is larger than the value represented by the following equation (1):

$$z = (P \cdot \tan \alpha \cdot \cot[\theta/2])/(\tan \alpha + \cot[\theta/2]) \cdot \{\cot[\theta/2] + \cot\theta / (\cot[\theta/2] - \cot \theta)\} \quad (1)$$

$$n \cos[3\theta/2] = \sin(\alpha - [\theta/2]) \quad (2)$$

(n represents the refractive index of the elongated prisms)

As an example of the above convex curved-surface shape may be considered a convex arc-surface shape having an apex portion and a bottom portion which are common to the virtual elongated prism (that is, the shape passing the apex portion of each virtual elongated prism and the valley of curvature r. Here, the value of the radius of curvature r normalized by P (r/P) is preferably set in the range from 2 to 80, and more preferably in the range from 7 to 30.

By setting the shape of the elongated prisms 5 as described above, the distribution angle (half-value width) of light emitted from the light deflecting device 3 can be reduced. The reason for this is as follows. That is, light which reaches an area nearer to the light emission surface 11 than the internal reflection position K2 of the prism face I-2 of the virtual elongated prism I is an assembly of light beams which are incident from the lower side below the apex portion of a neighboring virtual elongated prism at the primary light source side at an inclination angle larger than α. Accordingly, the direction of the distribution peak of the light beams is an inclination direction having an angle larger than α, and the direction of the distribution peak of the internal reflection light corresponds to the direction which is inclined toward a direction along the virtual prism face of the internal reflection from the normal direction of the light emission surface 11. Such light has an action of expanding the anglular distribution of the emission light from the light emission surface 11. Therefore, in order to emit light while the light amount is concentrated to a specific direction, the inclination angle of the prism face of the actual elongated prism at a position nearer to the light emission surface 11 than the internal reflection position K2 of the prism face I-2 of the virtual elongated prism I is set to larger than the inclination angle of the corresponding virtual prism face, whereby the travelling direction of the light which is actually internally reflected in this area can be corrected to be more shifted toward the normal direction of the light emission surface 11 as compared with the reflection light from the virtual prism face. Therefore, the luminance can be more enhanced, and the angle of visual field can be more narrowed.

The actual prism face corresponding to the virtual prism face I-1 is preferably designed to have the same shape as described above (that is, the shape which is symmetrical with the actual prism face corresponding to the virtual prism face I-2 with respect to the normal direction of the light emission surface 11.

In the case of an asymmetrical elongated prism, the above equation on the value of z cannot be directly used. However, when the pitch of the asymmetrical elongated prisms is determined and the inclination angle of the prism face I-1 nearer to the light source is set to some value, the internal reflection position K2 and the inclination angle of the prism face I-2 can be uniquely determined so that a light beam which goes past the apex portion of a neighboring virtual prism from the light quide and is refracted and transmitted through the I-2 face at a certain emission peak angle is internally reflected (deflected) at the position of K2 of the prism face I-2 in the normal direction, whereby a virtual asymmetrical triangle can be assumed and the prism design principle to narrow the angle of visual field can be applied in the same manner as described above.

In the above case, the light is emitted in the normal direction of the light emission surface 11 of the light deflecting device 3. However, when it is required that the peak emission light is emitted at a desired angle to narrow the angle of visual field, irrespective of whether the elongated prism is symmetric or asymmetric, the inclination angle of the prism face I-2 and K2 can be uniquely determined so that a light beam which goes past the apex portion of the neighboring virtual prism and is refracted and passed through the prism face I-1 at a certain emission peak angle is directed in the desired direction, and thus the design principle to narrow the angle of visual field can be applied in the same manner as described above.

When narrowing of the angle of visual field as described above, in the emission light distribution within a plane perpendicular to both the light incident face and the light emission face 4 of the light guide 2, the half-value width A of the emission light from the light emission surface 11 of the light deflecting device 3 is preferably set in the range from not less than 30% to less than 100% of the half-value width B of the emission light from the light emission face 4 of the light guide 2, and more preferably set in the range from 40 to 90%. This is because an image, etc. can be prevented from being unclear due to extreme narrowing of the angle of visual field by setting the half-value width A to 30% or more of the half-value width B, and the enhancement of luminance and the suitable narrowing of the angle of visual field can be performed by setting the half-value width A to less than 100% of the half-value width B.

On the other hand, when the angle of visual field is required to be expanded (the width of the angular distribution of the emission light from the planar light source is increased) unlike the above case, the prism face in the cross-sectional shape of each elongated prism 5 of the light deflecting device 3 is designed to have a concave curved-surface shape, whereby the light can be deflected so as to expand the distribution angle when the light is internally reflected from the prism face and thus the range of the angle of visual field can be set to be relatively large. The setting of the shape of the elongated prisms 5 can be performed in the same manner as the case where it is set to the convex curved-surface shape as described above. Accordingly, if the inclination angle of a part or the whole of the prism face nearer to the light guide than K2 of the prism face I-2 is set to be larger than the inclination angle of the virtual prism face, whereby the angle of visual field can be expanded, that is, the emission light distribution can be expanded. Next, the case where the elongated prisms 5 are formed on the light emission surface 11 of the light deflecting device 3 will be described with reference to FIG. 9.

Figure 9:
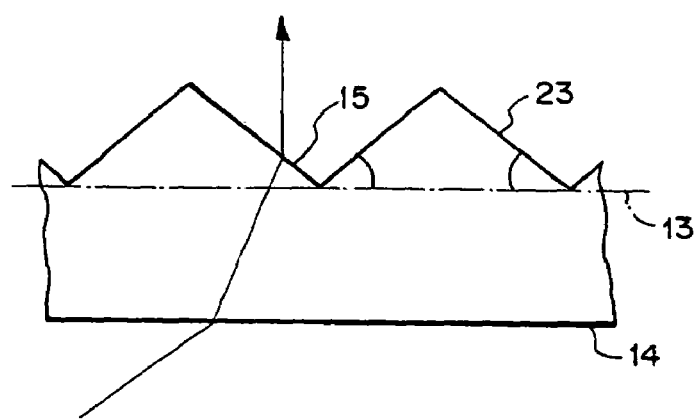
FIG. 9 is a diagram showing the shape of a prism unit of an embodiment of a light deflecting device according to the present invention.

As shown in FIG. 9, the emission light emitted from the light emission face 4 of the light guide 2 is incident on the light incident surface 14 of the light deflecting device 3 while being refracted. The incident light is incident to the prism face 15 farther from the primary light source 1, and emitted while being refracted. When such a light deflecting device 3 is used, the action of deflecting light is relatively weak, and thus a light diffusion sheet or prism sheet for controlling the travelling direction of light may be interposed between the light emission face 4 of the light guide 2 and the light deflecting device 3. Alternatively, another light diffusion sheet or prism sheet may be disposed on the light deflecting device 3 so as to direct the emission light in the normal direction of the light emission surface 11. The intersecting angle between the prism face 15 for mainly refracting the incident light and the reference plane 13 of the light deflecting device 3 is preferably set in the range from 35 to 55 degrees. If this angle is smaller than this range, the deflecting action of light by refraction is generally insufficient. On the other hand, if this angle is larger than this range, the auxiliary peak is generally increased. Here, the reference plane 13 of the light deflecting device 3 is set to a plane on the assumption that the surface of the light deflecting device on which the elongated prisms 5 are formed is smooth as shown in FIG. 9. Even when the elongated prisms 5 are formed on the light emission surface 11 of the light deflecting device 3 as described above, the shape of each elongated prism 5 can be substantially symmetrical between the right and left sides as in the case where the elongated prisms 5 are formed on the light incident surface 14 of the light deflecting device 3. When the two prism faces intersects to the reference plane 13 at different angles, the difference between the intersecting angles of the two prism faces to the reference plane 13 is preferable set within 10 degrees, more preferably set to 5 degrees or less, and still more preferably set to 2 degrees or less.

In consideration of durability of a metal mold, etc. when a prism pattern is formed, each elongated prism 5 formed on the light deflecting device 3 may be shaped to have a curved surface (that is, curved line in cross section) at its apex portion or to be flattened at its apex portion. By using such a shape, the durability of the metal mold can be enhanced, and the manufacturing cost can be reduced. The working of the apex portion having such a shape is required to be performed so that the optical characteristic of the light deflecting device 3 is not damaged. In the present invention, a prism sheet which functions to deflect (vary the angle of) the emission light from the light guide 2 in a desired direction and on which the elongated prisms as described above are formed is preferable as the light deflecting device 3. However, elongated lenses having various shapes in accordance with its application purpose may be used as elongated lenses to be formed on a lens sheet. For example, a lenticular lens shape, a fly eye lens shape, a wave-like shape or the like may be used.

The light guide 2 of the present invention is not limited to a specific one, and any type of light guide 2 may be used insofar as it makes light emitted from the primary light source 1 propagate radially therethrough with the primary light source 1 positioned at the center and also emits the light with directionality by the directional light emitting structure formed on the light guide 2 so that the peak light of the emission light distribution in a slant direction with respect to the light emission face 4 on a plane which is parallel to the travelling direction of the light propagating through the light guide 2 and perpendicular to the light emission face 4.

The directional light emitting structure may be formed on the light guide 2 by forming an uneven shape on at least one of the light emission face 4 of the light guide 2 and the back surface of the light guide 2, or by forming a structure having a refractive index different from that of the base material in the light guide 2, for example, containing light diffusion fine particles having a refractive index different from that of the base material to thereby form the directional light emitting structure. The incident angle of the light to the light emission face 4 is varied by the directional light emitting structure while it propagates through the light guide 2, and then emitted from the light emission face 4 when the incident angle to the light emission face 4 is reduced to be less than the critical angle.

In order to design the surface of the light guide 2 in an uneven shape to thereby form the directional light emitting structure, a lens surface on which elongated lenses such as elongated prisms, lenticular lenses, V-shaped grooves or the like are arranged in parallel to each other, or a roughened surface (mat-finished surface) may be formed on the surface of the light guide 2. The directional light emitting structure may be formed on the light guide 2 by combining plural directional light emitting structures. In the light guide 2 having such a directional light emitting structure, it is preferable that the direction of the peak emission light in the emission light distribution of the emission light emitted from the light emission face 4 intersects to the light emission face 4 at an angle of 10 to 50 degrees, and the half-value width of the emission light distribution is equal to 10 to 40 degrees. Particularly when a prism sheet having a prism face which is designed to have a convex curved-surface shape described above is used as the light deflecting device 3, the prism sheet is suitably used for the light guide 2 in which the half band width of the emission light distribution of the emission light emitted from the light emission face 4 is equal to 10 to 30 degrees. This is because when the emission light having the above half-value width is deflected by the prism sheet comprising the plane-shaped prism face, the half-value width of the emission light emitted from the prism sheet trends to be larger than that of the light guide 2 and thus the enhancement of the luminance may be lost.

According to the present invention, in the roughened surface or the lens surface as the directional light emitting structure, the average slant angle θa of ISO 4287/1-1984 is set in the range from 2 to 12 degrees, and more preferably in the range from 3 to 10 degrees. If the average slant angle θa is less than 2 degrees, the light emission rate of the light guide 2 is small, and the emission amount of light is insufficient, so that the luminance trends to decrease. Conversely, if the average slant angle θa exceeds 12 degrees, the light emission rate of the light guide 2 is large, and the emission light amount in the neighborhoodof the primary light source 1 is increased, so that the uniformity of the luminance within the light emission face 4 trends to be lowered.

In the present invention, the average slant angle θa of the roughened surface or the lens surface may be uniform within the surface of the light guide 2 or varied continuously, discretely or partially. For example, in order to enhance the uniformity of the luminance within the light emission face 4, it is preferable that the average slant angle θa is increased as the distance from the primary light source 1 is larger. When there exists a place at which the luminance within the light emission face 4 is partially reduced, the average slant angle θa at that place is increased, or when there exists a place at which the luminance is partially increased, the average slant angle θa at that place is reduced, whereby the emission light amount is partially controlled to make the luminance uniform.

The average slant angle θa of the roughened surface or lens surface formed on the light guide 2 is calculated as follows. That is, the roughened surface shape is measured according to ISO4287/1-1984 by using a probe type surface roughness tester, an inclination function f(x) is achieved (x represents the coordinate in the measuring direction), and then the average slant angle θa is calculated on the basis of the inclination function f(x) thus achieved by using the following equations (3) and (4). Here, L represents the measurement length, and Δa represents the tangent of the average slant angle θa.

$$\Delta a = (1/L)\int_0^L |(d/dx)f(x)|dx \qquad (3)$$

$$\theta a = \tan^{-1}(\Delta a) \qquad (4)$$

Figure 10:
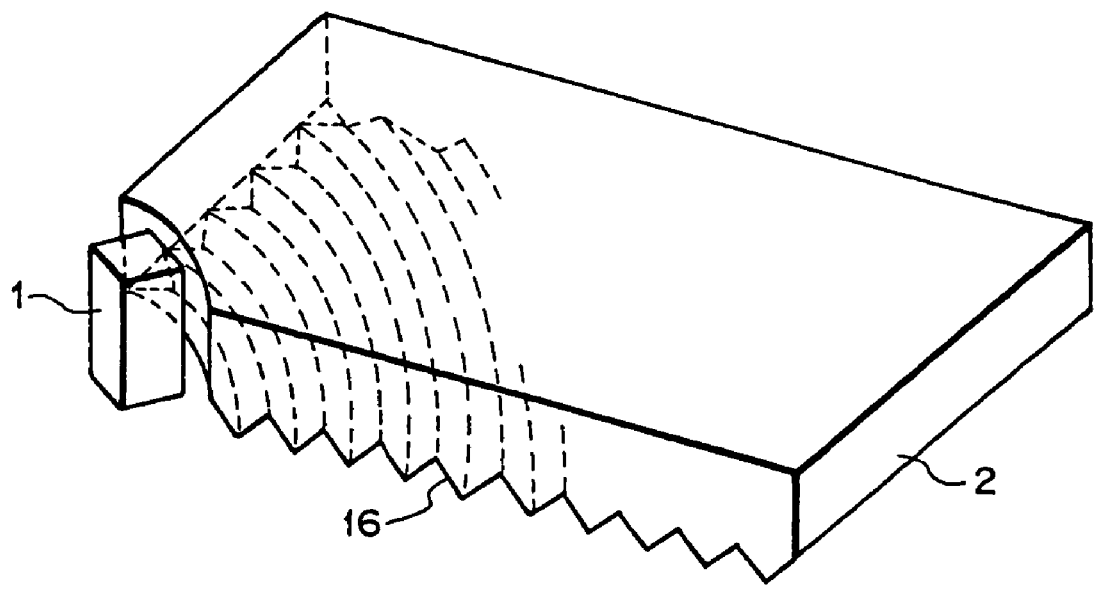
FIG. 10 is a diagram showing the surface shape of an embodiment of a light guide according to the present invention.
Figure 11:
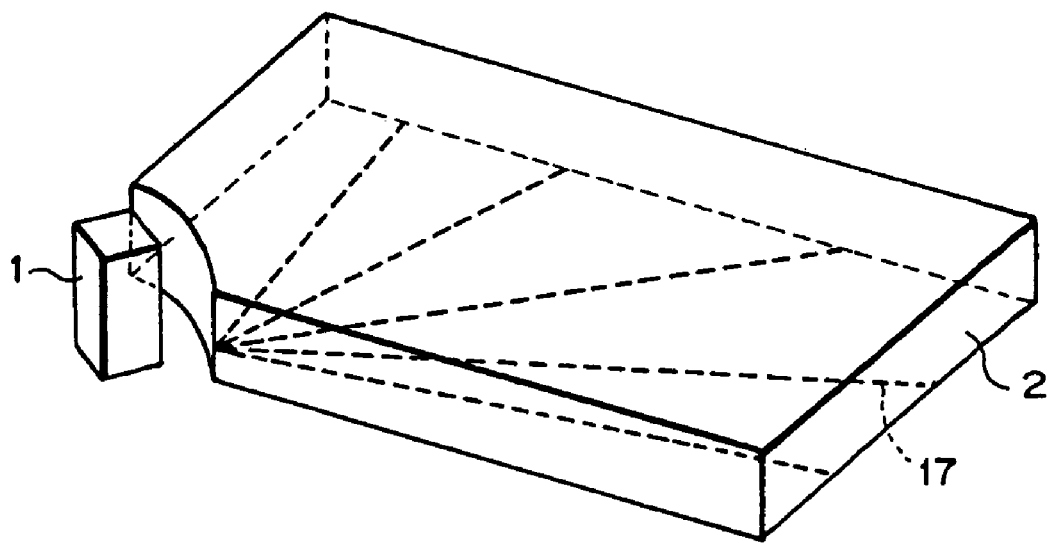
FIG. 11 is a diagram showing the surface shape of an embodiment of a light guide according to the present invention.
Figure 12:
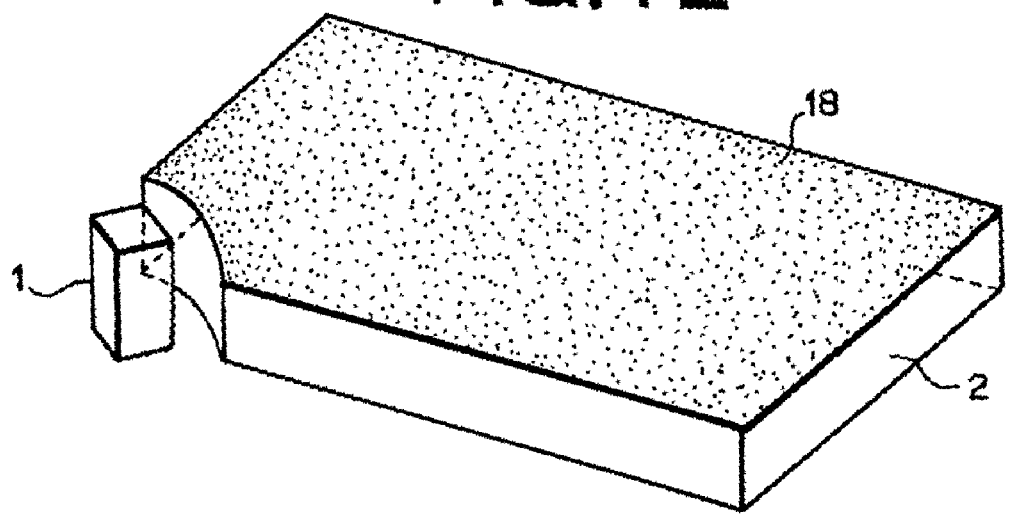
FIG. 12 is a diagram showing the surface shape of an embodiment of a light guide according to the present invention.
Figure 13:
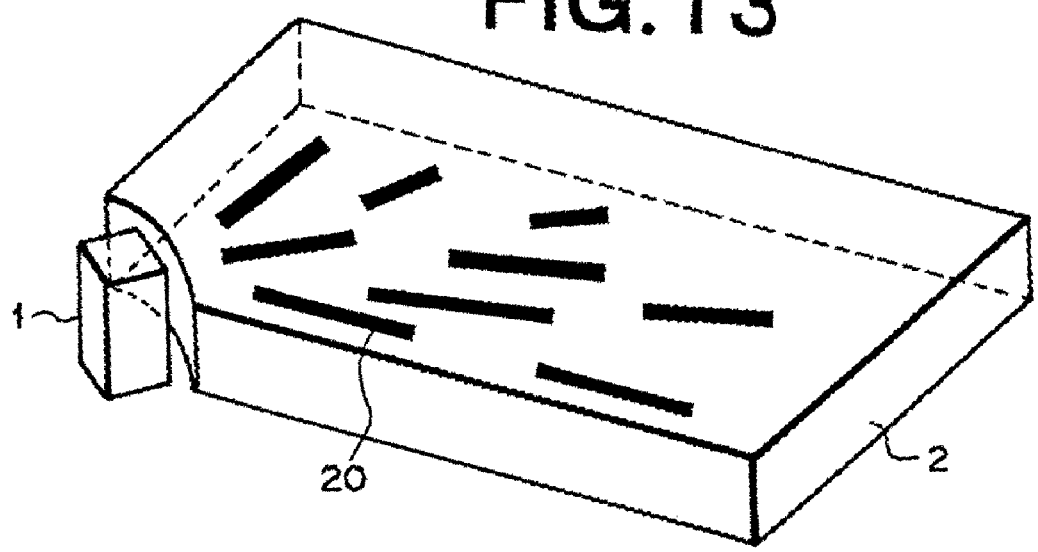
FIG. 13 is a diagram showing the surface shape of an embodiment of a light guide according to the present invention.

FIGS. 10 to 13 show embodiments of the directional light emitting structure formed on the light guide 2. FIG. 10 shows an embodiment in which arc-shaped elongated prisms 16 are formed on the back surface of the light guide 2 with the primary light source 1 positioned substantially at the center. FIG. 11 shows an embodiment in which radially elongated prisms 17 are formed on the back surface of the light guide 2 with the primary light source 1 positioned substantially at the center. FIG. 12 shows an embodiment in which a roughened surface 18 is formed on the light emission face 4 of the light guide 2. FIG. 13 shows an embodiment in which stripe-shaped different-refractive-index layers 20 constituting the light guide are formed radially with the primary light source 1 positioned substantially at the center on the back surface of the light guide 2.

In the present invention, the directional light emitting structure is not limited to the above embodiments, and other directional light emitting structures may be used. Further, the surface of the light guide 2 on which the directional light emitting structure is formed may be the surface at the opposite side to the above-described. Further, the present invention is not limited to the directional light emitting structure as described above. For example, light diffusion fine particles having a refractive index different from that of the base material constituting the light guide 2 may be dispersed in the light guide 2, a light diffusion layer 19 dispersed with light diffusion fine particles having a refractive index different from that of the base material constituting the layer may be formed on the light emission face 4 of the light guide 2, or different-refractive-index layers 20 having a refractive index different from that of the base material constituting the light guide 2 may be formed on the back surface of the light guide 2 so as to be disposed in an arc-shaped arrangement with the primary light source 1 positioned substantially at the center.

Of these embodiments, the embodiment in which the arc-shaped elongated prisms 16 arranged substantially around the primary light source 1 as shown in FIG. 10 are formed as the directional light emitting structure is preferable because light propagating through the light guide 2 in the radial direction with the primary source 1 positioned substantially at the center can be emitted from the light emission face 4 without great variation of the travelling direction of the light, and thus most of the light can be deflected in a desired direction by the light deflecting device 3, so that there can be provided a planar light source system which provides high luminance and has excellent uniformity in luminance.

In the present invention, since a substantially point-shaped light source such as an LED light source or the like is used as the primary light source 1, the light incident to the light guide 2 propagates through the light guide 2 in the radial direction with the primary light source 1 positioned substantially at the center substantially on the same plane as the light emission face 4. If the arc-shaped elongated prisms 16 are disposed in a substantially arc-shaped and parallel arrangement so as to surround the primary light source 1, most of the light propagating radially through the light guide 2 are incident substantially in the perpendicular direction to the arc-shaped elongated prisms 16. Therefore, the light can be efficiently emitted in a desired direction irrespective of the propagation direction within substantially the same plane as the light emission face 4, and the propagation direction can be easily kept. In addition, the emission light can be efficiently directed into a specific direction over the whole area of the light emission face 4 of the light guide 2, so that the uniformity of the luminance can be enhanced.

It is preferable that the degree of the arc of the substantially arc-shaped elongated prisms 16 is suitably determined in accordance with the distribution of light propagating through the light guide 2 so that most of the light propagating radially through the light guide 2 is incident in the perpendicular direction to the arc-shaped elongated prisms 16.

Figure 14:
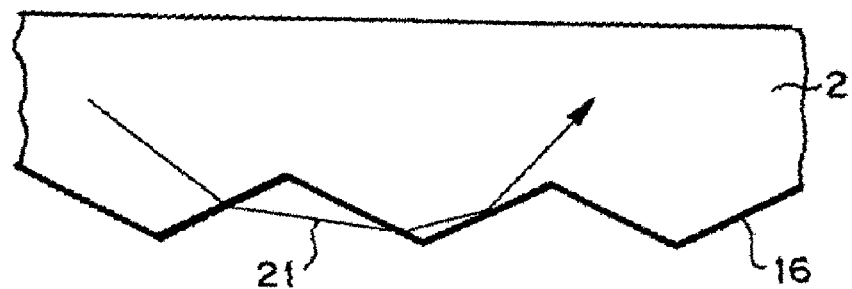
FIG. 14 is a diagram showing a cross section taken along a radial direction of a light guide according to the present invention which has an arc-shaped elongated prisms formed thereon.
Figure 15A:
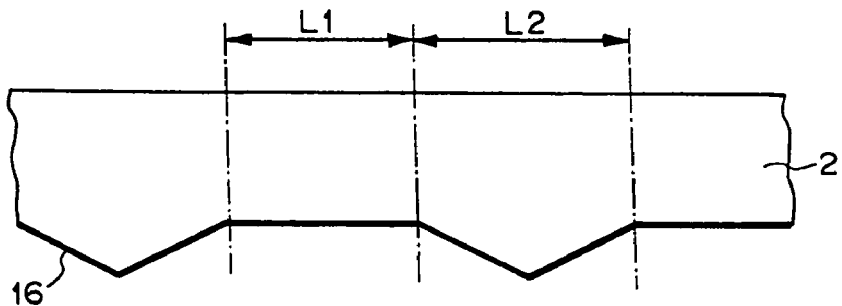
FIG. 15A is a diagram showing a cross section taken along a radial direction of a light guide according to the present invention which has an arc-shaped elongated prisms formed thereon.
Figure 15B:
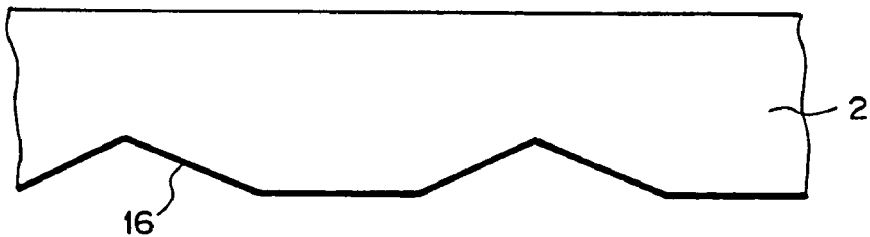
FIG. 15B is a diagram showing a cross section taken along a radial direction of a light guide according to the present invention which has an arc-shaped elongated prisms formed thereon.

When the arc-shaped elongated prisms 16 arranged with the primary light source 1 positioned at the center are formed as the directional light emitting structure, the distribution in the radial direction of the arc-shaped elongated prisms 16 may be formed continuously as shown in FIG. 14 or discretely with flat portions interposed between neighboring arc-shaped elongated prisms 16 as shown in FIG. 15A. When the arc-shaped elongated prisms 16 are continuously formed, there may exist light 21 which is emitted from an arc-shaped elongated prism 16 and then incident on a neighboring arc-shaped elongated prism 16 as shown in FIG. 14. If a large amount of such light 21 exists, disturbance of the emission light distribution of the emission light emitted from the light guide 2 is greater, and thus a larger amount of light is not deflected in a desired direction by the light deflecting device 3, resulting in reduction of luminance. In such a case, by discretely forming the arc-shaped elongated prisms 16 as shown in FIG. 15A, the amount of such light 21 as described above can be reduced, so that the reduction of the luminance due to the disturbance of the distribution of the emission light emitted from the light guide 2 can be suppressed. When the arc-shaped elongated prisms 16 are discretely formed as described above, the arc-shaped elongated prisms 16 may be formed in a concave shape as shown in FIG. 15B.

The arc-shaped elongated prisms 16 may be formed so that the sectional shape thereof is a triangular shape, an arc shape, a semicircular shape, a polygonal shape or the like. Among these shapes, substantially the triangular sectional shape is most preferable because it can reduce the amount of light 21 as shown in FIG. 14 and suppress the reduction of the luminance due to the disturbance of the light distribution of the emission light emitted from the light guide 2.

Figure 16A:
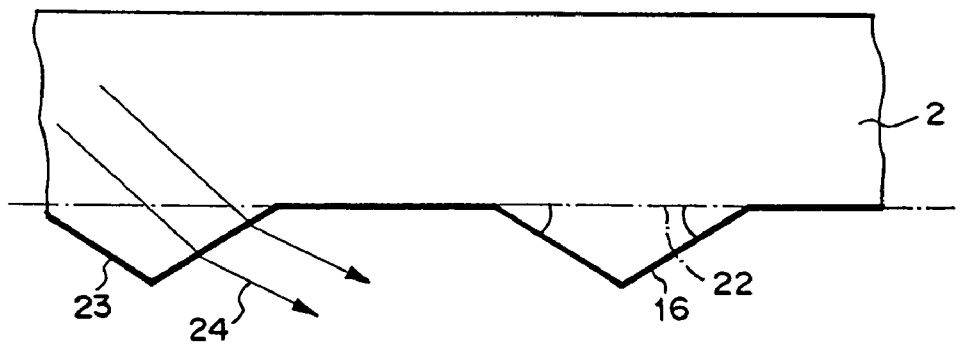
FIG. 16A is a diagram showing a cross section taken along a radial direction of a light guide according to the present invention which has an arc-shaped elongated prisms formed thereon.

With respect to the arc-shaped elongated prisms each having a substantially triangular sectional shape as described above, the intersecting angle between the prism face 23 nearer to the primary light source 1 and the reference plane 22 of the light guide 2 is preferably set in the range from 2 to 20 degrees, and more preferably in the range from 4 to 12 degrees as shown in FIG. 16A. This is because the emission angle of the peak emission light in the distribution of the emission light emitted from the light guide 2 and the half-value width of the emission light distribution are varied in accordance with the intersecting angle between the prism face 23 and the reference plane 22 of the light guide 2. If the intersecting angle between the prism face 23 and the reference plane 22 of the light guide 2 exceeds 20 degrees, the half-value width of the emission light distribution increases so that the luminance trends to decrease. If the intersecting angle between the prism face 23 and the reference plane 22 of the light guide 2 is less than 2 degrees, the amount of the emission light from the light guide 2 is reduced, and the luminance trends to decrease. Here, the reference plane 22 of the light guide 2 is defined as a plane on the assumption that the surface of the light guide 2 on which the arc-shaped elongated prisms are formed is smooth as shown in FIG. 16A.

In the case where the arc-shaped elongated prisms 16 are discretely formed, if the ratio L2/L1 of a prism portion L2 having each arc-shaped elongated prism 16 formed thereon and a flat portion L1 formed between neighboring arc-shaped elongated prisms 16 is varied in the circumferential direction of the arc-shaped elongated prism 16, that is, the ratio L2/L1 is reduced in a direction of the light propagation in the light guide 2 in which the light amount is larger while the ratio L2/L1 is increased in a direction of the light propagation in the light guide 2 in which the light amount is smaller, thereby enhancing the uniformity of the luminance.

By varying the ratio L2/L1 in the radial direction of the arc-shaped elongated prisms 16, unevenness of luminance in an area where the luminance is low (for example, corner portions of the light emission face 4, etc. of the light guide 2), and unevenness of luminance in an area where the luminance is high (for example, an area in the neighborhood of the primary light source 1, etc.) can be improved. The uniformity of the luminance can be enhanced by reducing the ratio L2/L1 as the distance from the primary light source 1 is increased. A method of varying the interval at which the elongated prisms are formed, a method of varying the depth of the prism shape of the elongated prisms and a method of varying both the interval and the depth may be used as a method of varying the ratio L2/L1.

The arc-shaped elongated prisms 16 may be discretely formed in the circumferential direction thereof. However, it is difficult to form arc-shaped elongated prisms 16 each having an accurate shape, and thus the elongated prisms are preferably formed continuously in the circumferential direction of the arc.

Figure 16B:
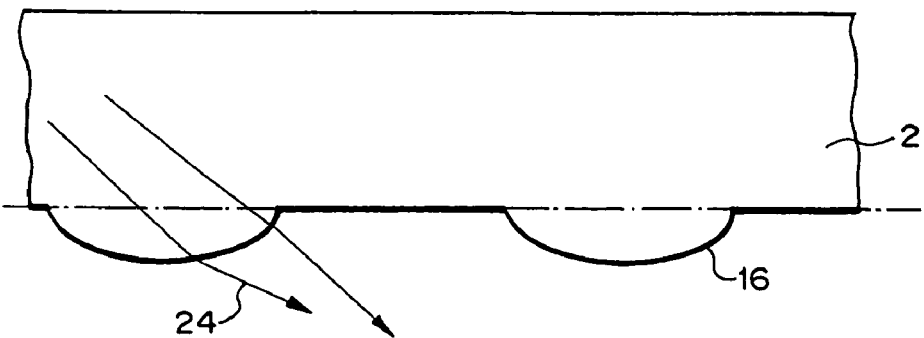
FIG. 16B is a diagram showing a cross section taken along a radial direction of a light guide according to the present invention which has an arc-shaped elongated lenses formed thereon.
Figure 17A:
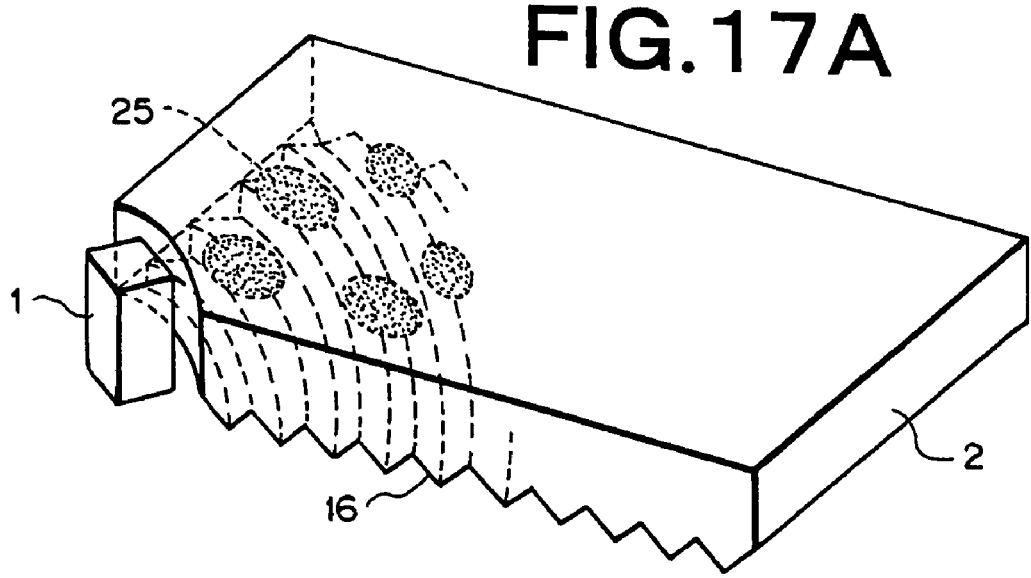
FIG. 17A is a perspective view showing patterning of a light guide according to the present invention on which arc-shaped elongated prisms are formed.
Figure 17B:
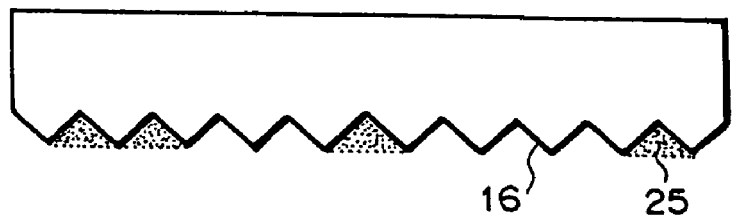
FIG. 17B is a cross-sectional view of FIG. 17A.

In the present invention, arc-shaped elongated lenses 16 may be formed as shown in FIG. 17B. In FIGS. 16A and 16B, reference numeral 24 represents light beams.

In the present invention, resin may be embedded in a desired pattern on the lens face having the arc-shaped elongated prisms 16 or the like formed thereon or the roughened surface to form emboedding portions 25 on the lens face or the roughened surface to partially flatten the lens face or the roughened surface as shown in FIGS. 17A and 17B, whereby the uniformity of the luminance can be enhanced. The flattening rate is reduced at a portion where the luminance is required to be enhanced, and increased at a portion where the luminance is required to be reduced. Active energy ray curable composition whose polymerization rate has been increased to enhance the viscosity thereof or a mixture of an active energy ray curable composition and a thickener used for print ink may be used as the embedding resin to form the embedding portions 25 arranged in the desired pattern as described above.

The pattern of the arc-shaped elongated prism 16 of the light guide 2 can be suitably set in accordance with the arrangement manner of the primary light source 1 as shown in FIGS. 18 to 22, for example. In any case, the patterns are set so that most of light propagating radially in the light guide 2 is incident in the perpendicular direction to the arc-shaped elongated prisms 16. The arrows in these figures indicate the direction in which light from the primary light source 1 propagates through the light guide 2.

Figure 18:
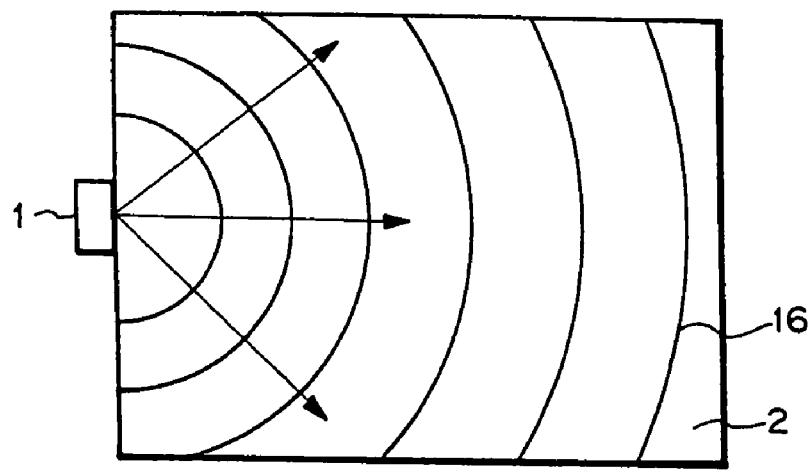
FIG. 18 is a diagram showing an embodiment of a pattern of arc-shaped elongated prisms of a light guide according to the present invention.

FIG. 18 is a diagram showing a case where a primary light source 1 is disposed at the center of one end surface of the light guide 2. As shown in FIG. 18, elongated prisms are formed in an arcuate arrangement so as to surround the primary light source and substantially perpendicularly cross lines extending from the primary light source in the radial direction.

Figure 19:
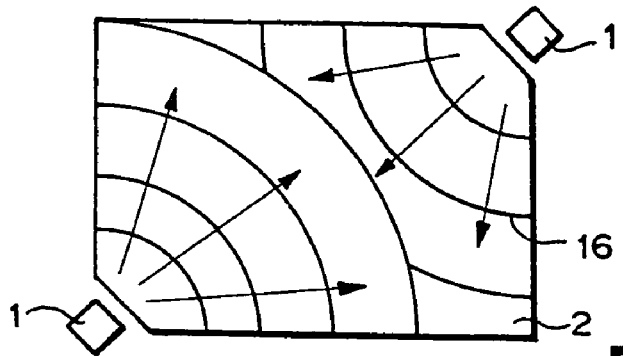
FIG. 19 is a diagram showing an embodiment of a pattern of arc-shaped elongated prisms of a light guide according to the present invention.

FIG. 19 shows a case where two primary light sources 1 are arranged at two corner portions corresponding to the diagonal positions of the light guide 2. Two groups of arc-shaped elongated prisms 16 each of which contains arc-shaped elongated prisms disposed in the arcuate arrangement with each primary light source 1 positioned substantially at the center are arranged substantially symmetrically with respect to the boundary corresponding to the line which is away from both the light emission faces at the same distance.

Figure 20:
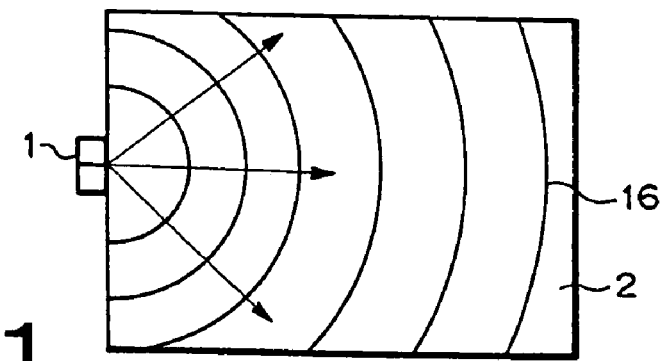
FIG. 20 is a diagram showing an embodiment of a pattern of arc-shaped elongated prisms of a light guide according to the present invention.

FIG. 20 shows a case where two point-shaped light sources are arranged at the center of one end surface of the light guide 2 and used as the primary light source. In this case, the elongated prisms are formed in the arcuate arrangement so as to cross substantially in the perpendicular direction to the lines extending in the radial direction from the substantially center point between the two point-shaped light sources and surround the light source 1.

Figure 21:
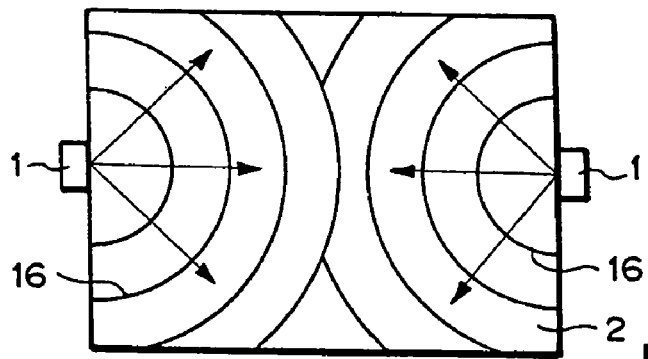
FIG. 21 is a diagram showing an embodiment of a pattern of arc-shaped elongated prisms of a light guide according to the present invention.

FIG. 21 shows a case where two primary light sources 1 are disposed at the center positions of two confronting end surfaces of the light guide 2. In this case, two groups of arc-shaped elongated prisms 16 which are arranged so as to surround the respective primary light sources 1 positioned at the center are formed so as to be symmetrical with respect to the center line of the light guide 2.

Figure 22:
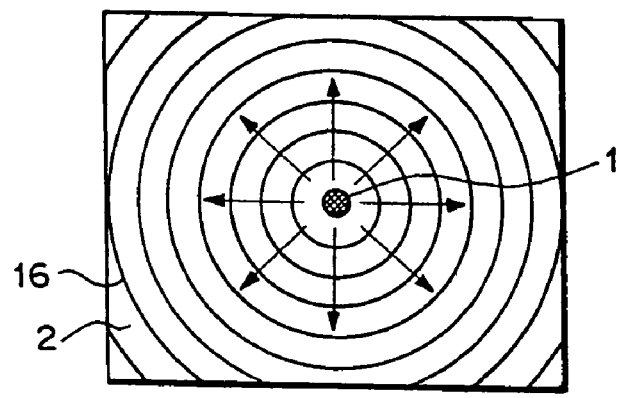
FIG. 22 is a diagram showing an embodiment of a pattern of arc-shaped elongated prisms of a light guide according to the present invention.

FIG. 22 shows a case where a primary light source 1 is disposed through air, resin or transparent material in a recess portion formed at the center portion of the back surface of the light guide 2, and the elongated prisms 16 are formed arcuately around the primary light source 1.

In the present invention, in order to control the emission light distribution in the direction perpendicular to the light propagation direction or make light propagate in a specific direction, uneven grooves 17 such as elongated prisms or the like may be formed in combination with the directional light emitting structure so as to extend in the radial direction with the primary light source 1 positioned substantially at the center, as shown in FIGS. 23A to 23F.

When a roughened surface is formed as the directional light emitting structure on the light guide 2, the light incident to the light guide 2 trends to expand in the circumferential direction with respect to the primary light source 1 positioned substantially at the center as the light incident to the light guide 2 propagates through the light guide 2. Therefore, by forming the grooves 17, the emission light distribution in the arrangement direction of the grooves 17 (in the circumferential direction with the primary light source 1 positioned substantially at the center) can be controlled to narrow, so that the luminance can be more enhanced.

Further, when the arc-shaped elongated prisms are formed as the directional light emitting structure on the light guide 2, the emission light distribution in the radial direction of the arc-shaped elongated prisms trends to narrow. Therefore, by forming the grooves 17, the emission light distribution in the radial direction of the arc-shaped elongated prisms can be controlled to expand, so that the angle of visual field can be increased. Further, the uniformity of the luminance can be enhanced by adjusting the ratio of the groove 17 and the flat portion.

Preferable arrangement patterns of the radially elongated uneven grooves 17 are shown in FIGS. 23A to 23F.

FIG. 23A shows a typical case of the radially elongated grooves 17. In this case, a normal radial pattern that the interval between the adjacent grooves 17 is increased as the distance from the primary light source 1 is increased is formed on the light emission face 4 of the light guide 2.

FIG. 23B shows a case where a radial pattern that the depth and width of the grooves 17 are increased as the distance from the primary light source 1 is increased is formed on the light emission face 4 of the light guide 2.

FIG. 23C shows a case where a pattern that many grooves 17 each having a relative short length are radially elongated is formed on the light emission face 4 of the light guide 2.

FIG. 23D show a case where a pattern that the depth and width of the grooves 17 are varied in accordance with the light distribution of the emission light from the primary light source 1, for example, a pattern that the depth and width of the grooves 17 are reduced along a direction in which the emission intensity is large while the depth and width of the uneven grooves 17 are increased along a direction in which the emission intensity is small is formed on the light emission face 4. In this case, the uniformity of the luminance in the circumferential direction with the primary light source 1 positioned substantially at the center can be enhanced.

FIG. 23E and FIG. 23F show cases where the grooves 17 are radially formed only in the neighborhood of the primary light source 1 on the light emission face 4 of the light guide 2 at which unevenness of luminance is liable to occur. In this case, occurrence of unevenness of luminance in the neighborhood of the primary light source 1 can be suppressed.

In the present invention, the arrangement pattern of the radial grooves 17 is not limited to those of the above embodiments, and the grooves 17 may have other shapes and patterns, or the surface of the light guide 2 on which the grooves 17 are formed may be the surface at the opposite side.

The radial pattern of the grooves 17 of the light guide 2 may be suitably set in accordance with the arrangement manner of the primary light source as shown in FIGS. 24 to 28.

Figure 24:
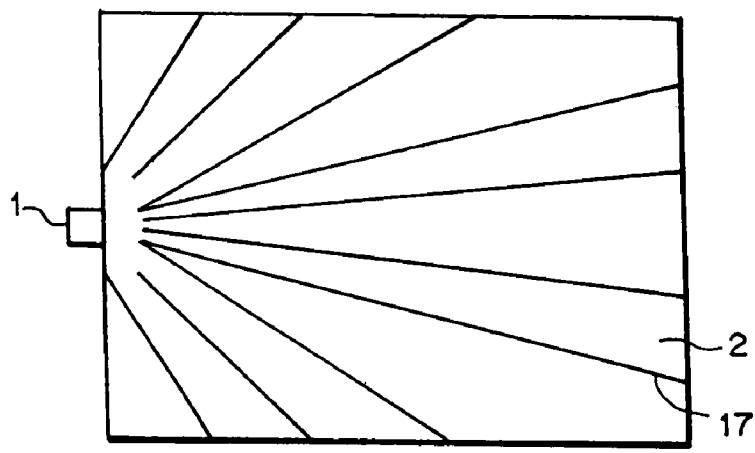
FIG. 24 is a diagram showing an embodiment of a pattern of radially elongated prisms of a light guide according to the present invention.

FIG. 24 shows a case where the primary light source 1 is disposed at the center of one end surface of the light guide 2. In this case, a radial pattern is formed so that the interval between adjacent grooves 17 is increased as the distance from the primary light source 1 is increased.

Figure 25:
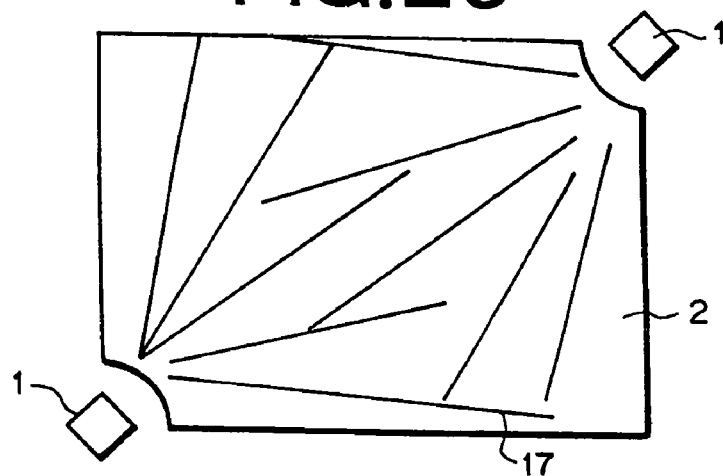
FIG. 25 is a diagram showing an embodiment of a pattern of radially elongated prisms of a light guide according to the present invention.

FIG. 25 shows a case where two primary light sources 1 are disposed at two corner portions corresponding to the diagonal positions of the light guide 2. In this case, two groups of grooves 17 are formed so as to extend in the radial direction with each of the primary light sources 1 positioned substantially at the center thereof, and the two groups of grooves which are respectively arranged in the radial direction with the respective primary light sources 1 positioned substantially at the center thereof are mixed at the center portion of the light guide 2.

Figure 26:
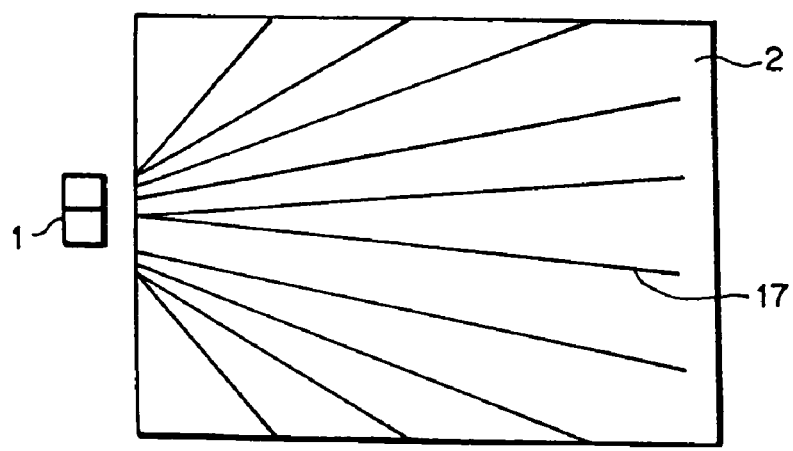
FIG. 26 is a diagram showing an embodiment of a pattern of radially elongated prisms of a light guide according to the present invention.

FIG. 26 shows a case where two point-shaped light sources 1 are arranged at the center of one end surface so as to be adjacent to each other. In this case, two groups of grooves 17 which are respectively arranged in the radial direction with the respective primary light sources 1 positioned substantially at the center are formed in the respective areas separated by the center line corresponding to the boundary between the two point-shaped light sources.

Figure 27:
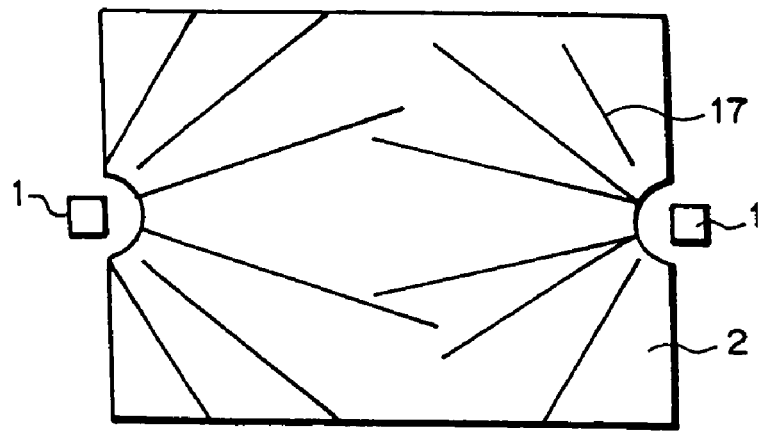
FIG. 27 is a diagram showing an embodiment of a pattern of radially elongated prisms of a light guide according to the present invention.

FIG. 27 shows a case where each of two primary light sources 1 is disposed at the center of each of two confronting end surfaces of the light guide 2. In this case, grooves 17 are formed so as to extend in the radial direction with each of the primary light sources 1 positioned substantially at the center thereof, and the respective groups of grooves which are arranged so as to extend in the radial direction with the respective primary light sources 1 positioned substantially at the center are mixed with one another at the center portion of the light guide 2.

Figure 28:
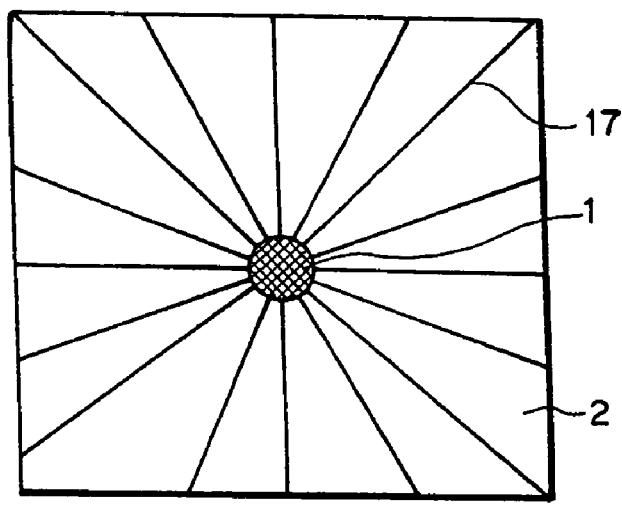
FIG. 28 is a diagram showing an embodiment of a pattern of radially elongated prisms of a light guide according to the present invention.

FIG. 28 shows a case where a primary light source 1 is disposed through air, resin or transparent material in a recess portion formed at the center portion on the back surface of the light guide 2. In this case, grooves 17 are formed so as to extend in the radial direction with the primary light source 1 positioned at the center thereof.

The sectional shape of the grooves 17 may be a substantially triangular shape, an arc shape, a semispherical shape, a polygonal shape or the like. Elongated prisms each having a substantially triangular shape in cross section or V-shaped grooves are preferable because the emission light distribution can be more efficiently controlled, and particularly a substantially isosceles triangular shape in cross section is more preferable.

Figure 29:
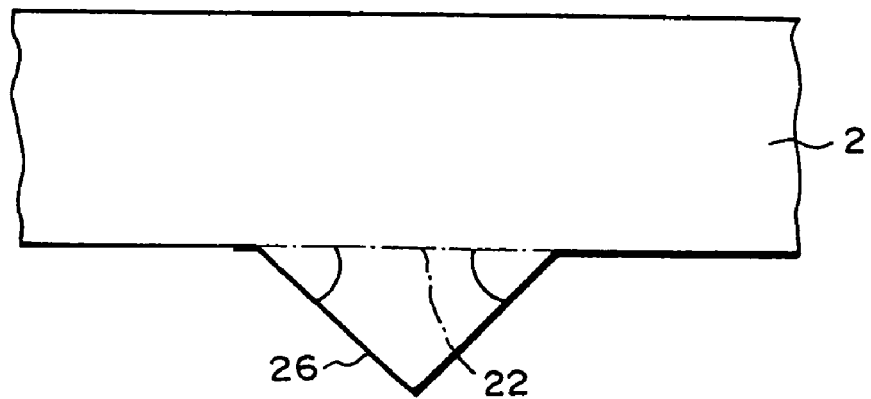
FIG. 29 is a diagram showing the shape of a prism unit of a light guide according to the present invention on which radially elongated prisms are formed.

In the grooves 17 each having a substantially triangular shape in cross section as described above, the efficiency to control the emission light distribution in the arrangement direction of the grooves 17 (in the circumferential direction with the primary light source 1 positioned substantially at the center) of the light emitted from the light emission face 4 of the light guide 2 is varied in accordance with the intersecting angle between the principal plane 26 of each groove 17 and the reference plane 22 of the light guide 2 as shown in FIG. 29. Therefore, the intersecting angle between the reference plane 22 of the light guide 2 and the principal plane of each groove 17 is preferably set in the range from 15 to 65 degrees, more preferably in the range from 15 to 40 degrees, and still more preferably in the range from 20 to 25 degrees.

Each groove 17 having a substantially triangular cross section may have a flat or curved-surface apex portion (that is, the cross section thereof has a curved-line shape). When the apex portion has a curved-line shape in cross section, the ratio (R/P) of the radius of curvature R of the apex portion and the length of the triangular bottom side (the width of the groove 17) P is preferably set in the range from 0.1 to 0.7. By setting R/P in the above range, the emission light distribution in the arrangement direction of the grooves 17 of the light emitted from the light emission face 4 of the light guide 2 can be efficiently controlled.

Further, in the present invention, various shapes such as a plate shape having a uniform thickness, a wedge shape, a boat-like shape, etc. may be used as the shape of the light guide 2. Among these shapes, such a wedge shape that the thickness is reduced as the distance from the primary light source 1 is increased is more preferable.

From the view of power consumption, an LED light source is preferable as the primary light source 1 used for the planar light source system of the present invention. However, another light source of substantially point-shaped light source such as a halogen lamp or the like may be used. Such a substantially point-shaped primary light source 1 may be disposed at a notch portion which is linearly or arcuately formed at a corner portion of the light guide 2 as shown in FIGS. 1 and 2, or disposed at an end surface of the light guide as shown in FIGS. 3 to 5, or disposed inside the light guide of the planar light source as shown in FIG. 6.

Further, a monochromatic light source, a white light source containing light having wavelengths of three primary colors of red, green and blue or the like may be used as the substantially point-shaped primary light source 1.

In the present invention, one substantially point-shaped primary light source 1 or a plurality of substantially point-shaped primary light sources 1 may be used as the primary light source 1 as described above. When a plurality of substantially point-shaped primary light sources are used, the substantially point-shaped primary light sources may be disposed at plural corner portions or plural end surfaces one by one as shown in FIG. 2 or 5, or the substantially point-shaped primary light sources may be collectively disposed at one corner portion or one end surface so as to be close to one another as shown in FIG. 4. When a plurality of substantially point-shaped primary light sources are arranged at one corner portion or an end surface so as to be close to one another, an LED array achieved by arraying plural substantially point-shaped light sources or the like may be used.

It is preferable that a point-shaped light source having the optimum light emission pattern (emission light distribution) in accordance with its purpose or required characteristics is used as the primary light source 1. In general, in order to moderate the phenomenon that the luminance at the front side of the primary light source 1 is higher than that at the other places, it is preferable that the expansion of the light emission pattern in the direction (a) parallel to the light emission face 4 of the light guide 2 is large, and the peak half-value width of the light emission pattern is preferably equal to about 120 to 180 degrees.

Preferred light emission patterns when the primary light source 1 is disposed at a corner portion or end surface will be described with reference to FIGS. 30A to 30C.

Figure 30A:
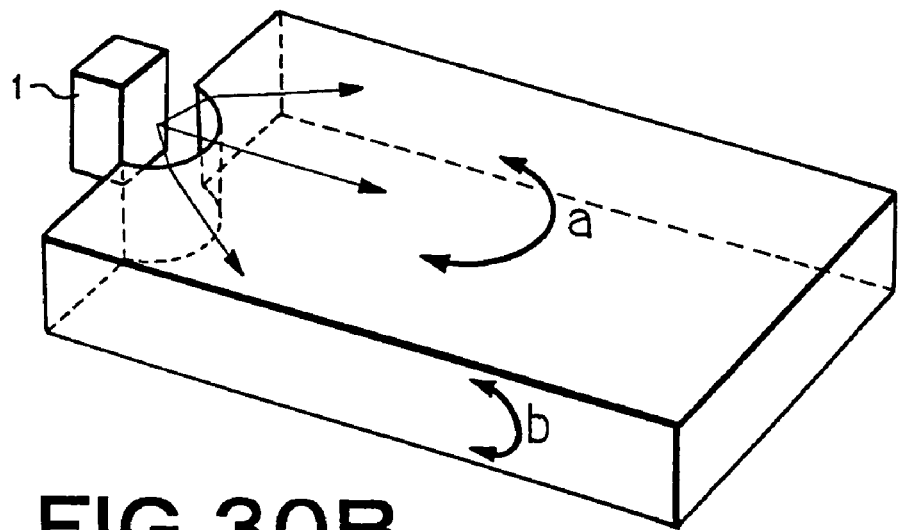
FIG. 30A is a diagram showing a light emission pattern of a primary light source.
Figure 30B:
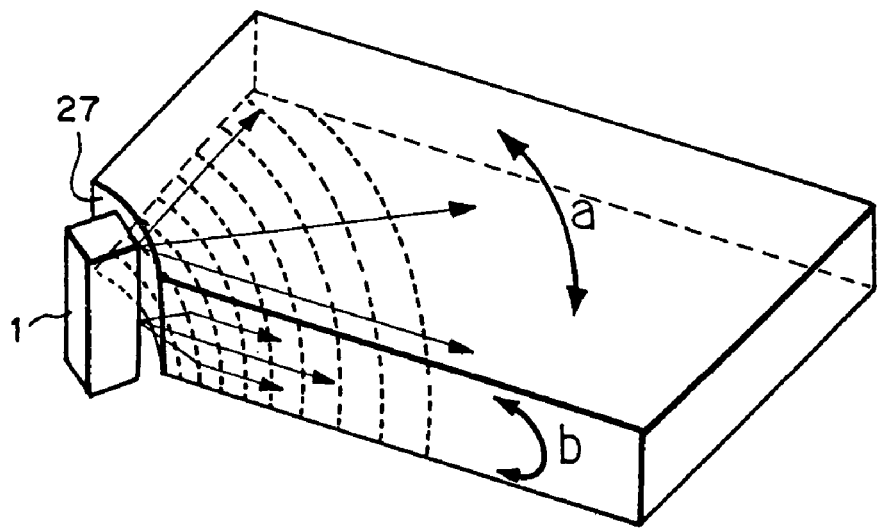
FIG. 30B is a diagram showing a light emission pattern of a primary light source.
Figure 30C:
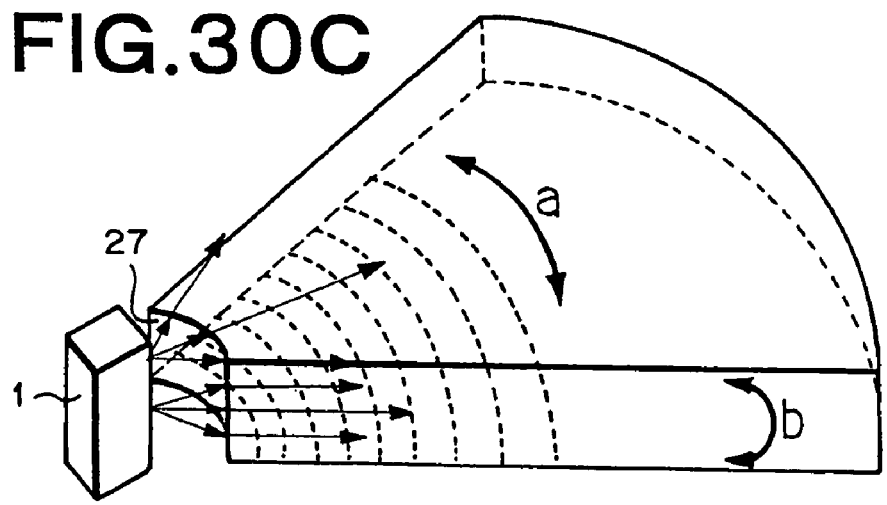
FIG. 30C is a diagram showing a light emission pattern of a primary light source.

When the primary light source 1 is disposed at the end surface of the light guide 2 as shown in FIG. 30A, a light emission pattern having a large expansion in the direction a is preferably used, and the peak half-value width is equal to about 140 to 180 degrees. Further, when the primary light source 1 is disposed at the corner portion of the light guide 2 as shown in FIGS. 30B and 30C, it is preferable that the light incident to the light guide 2 is expanded in the direction a to the overall surface of the light guide 2, and the expansion angle of the incident light is substantially coincident with the expansion of the plane of the light guide 2. Therefore, when the angle of the corner of the light guide 2 to which light is incident is equal to 90 degrees, it is preferable that the peak half-value width of the light emission pattern in the direction a of the primary light source 1 is equal to about 60 to 120 degrees. When the angle of the corner is equal to 45 degrees, it is preferable that the peak half-value width of the light emission pattern in the direction a of the primary light source 1 is equal to about 20 to 70 degrees.

Further, with respect to the light emission pattern in the direction b perpendicular to the light emission face 4 of the primary light source 1, it is preferable that the peak half-value width thereof is equal to about 10 to 90 degrees. The reason for this is as follows. If the light emission pattern in the direction b is excessively wide, the light is liable to be emitted in the neighborhood of the primary light source 1, and there is a tendency to reduce the uniformity of luminance. On the other hand, if the light emission pattern in the direction b is excessively narrow, the emission rate of the emission light from the light guide 2 is small, and thus there is a tendency to reduce the luminance.

In order to increase the expansion angle of the incident light in the direction a in the light guide 2, it is preferably that an arc-shaped notch portion 27 is formed on the end surface at which the primary light source 1 is disposed so that the primary light source 1 is located at the center of the arc-shaped notch portion 27. Further, the notch portion 27 may be designed to have an aspheric surface in order to adjust the luminance distribution in the light emission face 4 of the light guide 2.

Further, elongated lenses such as lenticular lenses or the like may be formed on the surface of a linearly-notched light incident portion. In this case, the pitch of the elongated lenses is preferably set in the range from 10 to 200 µm, and more preferably in the range from 20 to 100 µm. If the pitch is excessively small, it is difficult to design the elongated lenses in an accurate shape so that the incident light is efficiently expanded in the light guide, and thus desired performance cannot be achieved. On the other hand, if the pitch of the elongated lenses is excessively large, the number of elongated lenses which can be disposed in an effective area of the notched portion is reduced, and when a partial shape defect occurs in the elongated lenses, there is a tendency to make it more easily to visually recognize nonuniformity of luminance in the light distribution in the light guide 2.

According to the present invention, since a point-shaped light source such as LED or the like which has relatively high directionality is used as the primary light source 1, the emission light distribution on the same plane as the light emission face 4 of the light guide 2 may be narrowed to several degrees to ten and several degrees particularly when the elongated lenses are formed as the directional light emitting structure on the surface of the light guide 2, and fan-shaped bright lines with the primary light source 1 positioned substantially at the center thereof are observed in some cases when viewing from the normal direction of the light emission face 4. In such a case, by forming a finely roughened surface on the surface of the light guide 2 on which the elongated lenses are formed, the emission light distribution on the same plane as the light emission face 4 of the light guide 2 is expanded and occurrence of the bright lines with the primary light source 1 positioned substantially at the center can be suppressed. In this case, the roughened surface may be formed on the opposite surface in place of the surface on which the elongated lenses are formed, or formed on both the surfaces.

With respect to the degree of the roughness of the roughened surface, the average slant angle $\theta a$ according to ISO4287/1-1984 to the lens surface is preferably set in the range from 0.1 to 8 degrees, more preferably in the range from 0.5 to 6 degrees, and still more preferably in the range from 1 to 4 degrees. If the average slant angle $\theta a$ of the roughened surface is less than 0.1 degree, it is general that the effect of enlarging the emission light distribution on the same plane as the light emission face 4 cannot be sufficiently achieved. On the other hand, if the average slant angle $\theta a$ of the roughened surface exceeds 8 degrees, destruction of the shape of the elongated lenses is intensified, so that the directional light emission characteristic of the elongated lenses is lost or the emission light amount in the neighborhood of the light incident end surface is excessively increased, resulting a tendency to lose uniformity of luminance.

The same effect can be achieved by mounting a light diffusion sheet having anisotropic diffusion function on the light emission surface 11 of the light deflecting device 3. In this case, the anisotropic light diffusion sheet is disposed so that the diffusion-strong direction thereof is perpendicular to the line extending in the forward direction of the primary light source 1. Further, the same effect can be achieved by varying the height of the elongated lenses formed on the surface of the light guide 2 in the extending direction of the elongated lenses by a predetermined interval. In this case, as the height of the elongated lenses is increased and the interval at which the height of the elongated lenses is varied is reduced, the emission light distribution can be expanded. The variation of the height of the elongated lenses is preferably set in the range from 1 to 30 µm, and the interval is preferably set in the range from 10 to 1000 µm.

Materials having high optical transparency such as glass, synthetic resin or the like may be used as the material constituting the light guide 2 or the light deflecting device 3. For example, acrylic resin, polycarbonate resin, vinyl chloride resin, polyolefin resin, polystyrene, copolymer of methyl methacrylate and styrene or the like may be used. Such synthetic resin as described above may be molded into a plate shape by using a normal molding method such as extrusion molding, injection molding or the like to manufacture the light guide 2 and the light deflecting device 3. Particularly, methacrlic resin such as polymethyl methacrylate is excellent in optical transparency, heat resistance, mechanical characteristic and molding workability, and suitably applied as the material for the light guiding material. Such methacrylic resin contains methyl methacrylate as a main component, and preferably contains methyl methacrylate of 80 wt % or more.

In the present invention, active energy curable resin composition may be used to provide the surface shape such as a prism shape or the like to the light guide 2 and the light deflecting device 3. As an active energy curable resin composition may be used a composition mainly containing a polymerizable compound which contains acryloyl groups or methacryloyl groups in molecules, active energy sensitive radical polymerization initiator, active energy absorbent, etc. A compound such as photopolymerizable oligomer, multi-functional (meth)acrylate, monofunctional (meth)acrylate or the like may be used as the polymerizable compound having (meth)acryloyl groups in molecules. As the polymerizable oligomer may be used urethane poly(meth)acrylate oligomer achieved by reacting polyisocyanate having two or more isocyanate groups in a molecule with a compound having a hydroxyl group and a (meth)acryloyl group in a molecule, epoxy poly(meth)acrylate oligomer achieved by reacting an epoxy compound having two or more epoxy groups in a molecule with a carboxyl group and a (meth)acryloyl group in a molecule, or the like.

Specifically, there may be representatively used urethane poly(meth)acrylate oligomer achieved by reacting a diisocyanate compound such as isophorone diisocyanate, tetramethyl xylylene diisocyanate, xylylene diisocyanate, tolylene diisocyanate or the like with a hydroxyl group-containing (meth)acrylate compound such as hydroxyethyl(meth)acrylate, hydroypropyl(meth)acrylate, tetramethylol methane tri(meth)acrylate, glycerin di(meth)acrylate or the like, epoxy poly(meth)acrylate oligomer achieved by reacting bisphenol A diglycidyl ether, bisphenol F diglycidyl ether, bisphenol S diglycidyl ether, tetrabromo bisphenol A diglycidyl ether or the like with (meth)acrylic acid, or the like.

As the multifunctional (meth)acrylate compound may be used ethylene glycol di(meth)acrylate, diethylene glycol di(meth)acrylate, triethylene glycol di(meth)acrylate, polyethylene glycol di(meth)acrylate, tripropylene glycol di(meth)acrylate, polypropylene glycol di(meth)acrylate, polybutylene glycol di(meth)acrylate, 1,3-butylene glycol di(meth)acrylate, 1,6-hexanediol di(meth)acrylate, neopentyl glycol di(meth)acrylate, 2,2-bis[4-(meth)acryloyloxyphenyl]-propane, 2,2-bis[4-(meth)acryloyloxyethoxyphenyl]-propane, 2,2-bis[4-(meth)acryloyloxydiethoxyphenyl]-propane, 2,2-bis[4-(meth)acryloyloxypentaethoxyphenyl]-propane, 2,2-bis[4-(meth)acryloyloxyethoxy-3-phenylphenyl]-propane, bis[4-(meth)acryloyloxyphenyl]-sulfide, bis[4-(meth)acryloyloxyphenyl]-sulfone, bis[4-(meth)acryloyloxyethoxyphenyl]-sulfone, bis[4-(meth)acryloyloxyethoxyphenyl]-sulfone, bis[4-(meth)acryloyloxypentaethoxyphenyl]-sulfone, bis[4-(meth)acryloyloyloxypentaethoxyphenyl]-sulfone, bis[4-(meth)acryloyloxyethoxy-3-phenylphenyl]-sulfone, bis[4-(meth)acryloyloxyethoxy-3,5-dimethylphenyl]-sulfone, bis[4-(meth)acryloyloxyphenyl]-sulfide, bis[4-(meth)acryloyloxyethoxyphenyl]-sulfide, bis[4-(meth)acryloyloxypentaethoxyphenyl]-sulfide, bis[4-(meth)acryloyloxyethoxy-3-phenylphenyl]-sulfide, bis([4-(meth)acryloyloxyethoxy-3,5-dimethylphenyl]-sulfide, 2,2-bis[4-(meth)acryloyloxyethoxy-3,5-dibromophenypropane], trimethylol propane tri(meth)acrylate, tetramethylol methane tri(meth)acrylate, tetramethylol methane tetra(meth)acrylate, dipentaerythritol hexa(meth)acrylate or the like.

As the monofunctional (meth)acrylate compound may be used phenyl(meth)acrylate, benzyl(meth)acrylate, phenylethyl(meth)acrylate, phenoxyethyl(meth)acrylate, paracumyphenol ethyleneoxide-denatured (meth)acrylate, isobornyl(meth)acrylate, cyclohexyl(meth)acrylate, dicyclopentenyl(meth)acrylate, dicyclopentanyl(meth)acrylate, tetrahydrofuryl(meth)acrylate, methyl(meth)acrylate, ethyl(meth)acrylate, propyl(meth)acrylate, n-butyl(meth)acrylate, i-butyl(meth)acrylate, n-hexyl(meth)arylate, 2-hydroxyethyl(meth)acrylate, 2-hydroxypropyl(meth)acrylate, 2-hydroxybutyl(meth)acrylate, 4-hydroxybutyl(meth)acrylate, tetrahydrofurfuryl(meth)acrylate, phosphoethyl(meth)acrylate or the like.

In the present invention, each of the above compounds may be used alone or a mixture of the two or more kinds of the above compounds may be used.

The active energy sensitive radical polymerization initiator is a component for generating radicals in response to active energy rays such as ultraviolet rays or the like and initiates polymerization of the polymerizable compound as described above. It is preferable that the active energy sensitive radical polymerization initiator has an absorption area in a wavelength area of 360 to 400 nm and substantially has no absorption area in a wavelength area of 400 nm or more. This is because the active energy sensitive radical initiator has an absorption area in the wavelength range of 360 to 400 nm and thus it absorbs active energy rays which are not absorbed by the active energy absorbent, thereby efficiently generating radicals. In addition, since it substantially has no absorption area in the wavelength range of 400 nm or more, a lens portion having no color can be-formed. The substantial no absorption in the wavelength range above 400 nm means that the absorption caused by the active energy sensitive radical polymerization initiator in the wavelength range of 400 nm or more is equal to 1% or less in the actual using concentration of the active energy-ray sensitive radical polymerization initiator and the thickness of a light leakage modulator. The blend amount of the active energy sensitive radical polymerization initiator is preferably set in the range from 0.01 to 5 parts by weight with respect to the above polymerizable compound of 100 parts by weight, and more preferably in the range from 0.1 to 3 parts by weight. If the blend amount of the active energy sensitive radical polymerization initiator is less than 0.01 parts by weight, the hardening of the polymerizable compound is likely to be delayed. On the other hand, if the blend amount exceeds 5 parts by weight, the lens portion is likely to be colored.

As specific examples of the active energy sensitive radical polymerization initiator may be used 3,3-dimethyl-4-methoxy-benzophenone, benzyldimethyl ketal, isoamyl p-dimethylaminobenzoate, ethyl p-dimethylaminobenzoate, benzophenone, p-methoxybenzophenone, 2,2-diethoxyacetophenon, 2,2-dimethoxy-1,2-diphenylethane-1-one, 1-hydroxycyclohexylphenylketone, methylphenylglyoxylate, ethylphenylglyoxlate, 2-hydroxy-2-methyl-1-phenylpropane-1-one, 2-methyl-1-[4-(methylthio)phenyl]-2-morpholinopropanone-1,2,4,6-trimethyl-benzoyldiphenyl phosphine oxide, or the like. These materials may be used alone, or two or more kinds of materials may be blended with each other.

In the present invention, among these materials, methylphenylglyoxylate, 2-hydroxy-2-methyl-1-phenylpropane-1-one, 1-hydroxycyclohexylphenylketone, 2,2-dimethoxy-1,2-diphenylethane-1-one, benzyldimethylketal, 2,4,6-trimethylbenzoyldiphenyl phosphine oxide are particularly preferable from the viewpoint of hardening.

The active energy absorbent used in the present invention is a component for absorbing active energy rays incident as external light to suppress deterioration of the light guide layer due to the active energy rays and keep the adhesion thereto for a long term. Further, the active energy curable composition of the present invention may contain various additives such as oxidation inhibitor, yellowing inhibitor, blueing agent, pigment, settlement inhibitor, antifoamer, antistatic agent, antiblooming agent, etc. as occasion demands.

In the light guide 2 and the light deflecting device 3, a surface shape such as a lens pattern or the like can be formed on at least one surface of a transparent base material by using an active energy curable composition as described above. Particularly, the above construction is preferably applied to the light deflecting device 3. The material of the transparent base material is not limited to specific ones, and any material may be used insofar as the active energy rays can be transmitted through the material. For example, it may be a flexible glass plate or the like, however, it may be a transparent synthetic resin film, sheet or plate of acrylic resin, polycarbonate resin, vinyl chloride resin, polymethacrylimide resin, polyester resin or the like.

The light guide 2 and the light deflecting device 3 may be manufactured by a normal method such as an injection molding method, an extrusion molding method, a press molding method or the like in spite of the method of forming the surface shape by using the active energy curable composition as described above. The injection molding method is preferably used for the light guide 2, and the injection molding method or the method using the active energy curable composition is preferably used for the light deflecting device 3. A mold used to designing an uneven shape (pattern) on the surface of the light guide 2 and the light deflecting device 3 is achieved by marking an uneven shape such as an elongated prism pattern or the like on a metal plate or the like by cutting, etching, electric discharge machining, laser beam machining or the like. Particularly, the cutting method is preferable because it can achieve an accurate shape in short time. Further, when a mold having a roughened surface is manufactured, etching, blast finishing or the like is used.

Further, in order to form elongated lenses which are flattened in a pattern as shown in FIG. 16, an active energy curable composition or the like is printed onto a mold having elongated lenses formed on the surface thereof so that lens portions are embedded in a desired pattern. Thereafter, the active energy curable composition or the like is cured by irradiating active energy rays or the like, and then the surface shape of the mold is transferred by electroforming to achieve a mold for the light guide.

Next, the present invention will be described more specifically by using the following Examples and Comparative Example.

Measurement of Average Slant Angle

The measurement was performed at a driving speed of 0.03 mm/second by using a probe type surface roughness tester (SURFCOM 570A produced by Tokyo Seiki Co., Ltd.) with use of 55° conical diamond probe of 1 μmR (010-2528). The inclination correction was carried out on the basis of the average line of an extracted curved line, and then the center line average value of a curved line achieved by differentiating the above corrected curved line according to the equations (3) and (4) was calculated.

Measurement of Emission Light Distribution

A black sheet having a pin hole of 4 mmφ was fixed on the surface of the planar light source system so that the pin hole was located at the center of the surface, the distance between a luminance meter and the planar light source system was adjusted so that the measurement circle of the luminance meter was equal to 8 to 9 mm and the rotational axis of the goniometer was adjusted to rotate around the pin hole in the radial direction of the arc shape and in the circumferential direction of the arc shape with the light source positioned at the center thereof. The luminance distribution of emission light was measured by the luminance meter while the rotational axis was rotated in each direction at an angular interval of 0.5 degree from +80 degrees to −80 degrees.

EXAMPLE 1

Formation of Light Guide

A prism pattern in which arc-shaped elongated prisms each having an isosceles triangular cross section with an apex angle of 160 degrees were concentrically arranged at a pitch of 30 μm so as to surround substantially one corner of a rectangle of 48 mm×34 mm as a center and further a flat portion of 30 to 200 μm in width was formed between respective neighboring arc-shaped prisms so that the interval thereof was gradually reduced from the center was formed in an effective area Z of 40 mm×30 mm on the mirror-polished surface of a brass plate of 48 mm×34 mm in square and 3 mm in thickness by a cutting work, thereby achieving a metal mold. Injection molding was carried out by using the metal mold thus achieved and the mirror-polished brass plate of 48 mm×34 mm in square and 3 mm in thickness to achieve a rectangular light guide of 48 mm in long side length and 34 mm in short side length and 0.8 mm in thickness. Polymethylmethacrylate was used as the material of the injection molding.

Figure 31:
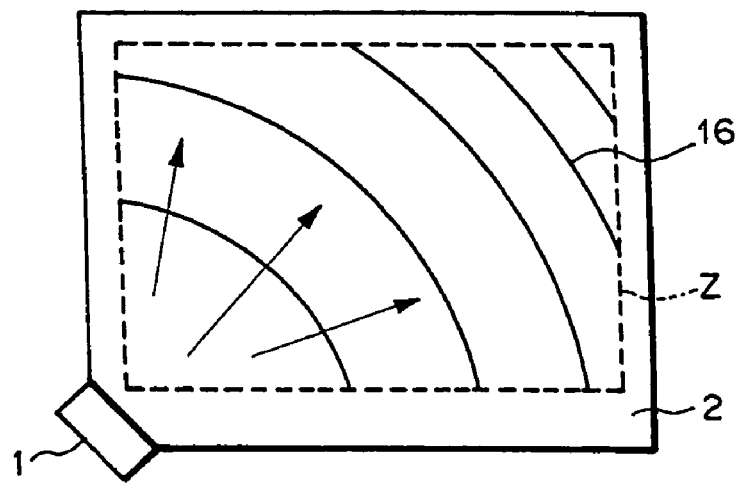
FIG. 31 is a diagram showing a pattern of arc-shaped elongated prisms of a light guide of an embodiment of the present invention.

The light guide thus achieved had one surface which was a smooth surface, and the other surface on which an arc-shaped prism pattern as shown in FIG. 31 was formed. A notch portion having a flat surface of a length of 4 mm was formed at the corner portion of the light guide surrounded by the arc-shaped elongated prisms.

Formation of Light Deflecting Device

A prism pattern in which arc-shaped elongated prisms each having a substantially isosceles triangular cross section with an apex angle of 65.4 degrees, each of two prism faces thereof between which the apex portion was interposed being designed as a convex curved surface of 400 μm in radius of curvature, were concentrically arranged in parallel to each other at a pitch of 50 μm so as to surround substantially one corner of a rectangle of 48 mm×34 mm was formed on the mirror-polished surface of a brass plate of 48 mm×34 mm in square and 3 mm in thickness by a cutting work, thereby achieving a metal mold. Thereafter, acrylic ultraviolet curable composition was poured into the metal mold thus achieved and a polyester film (A4000, refractive index of 1.600 produced by Toyobo Co., Ltd.) of 188 μm in thickness was laminated thereon. Thereafter, ultraviolet rays were irradiated through the polyester film by using a high-pressure mercury lamp to cure the acrylic ultraviolet curable composition, and then exfoliated from the metal mold to thereby achieve a prism sheet. In the prism sheet thus achieved, on one surface of the polyester film was formed an arc-shaped elongated prism pattern made of ultraviolet curable resin of 1.528 in refractive index and having arc-shaped elongated prisms concentrically arranged at a pitch of 50 μm with one corner portion of the rectangular prism sheet positioned substantially at the center, each arc-shaped elongated prism having a substantially isosceles triangular cross section and having two prism faces which defined an apex angle of 65.4 degrees therebetween and was designed to have a convex curved surface having a radius of curvature of 400 μm.

Formation of Planar Light Source System

A light diffusion reflection film (SU-110 produced by Tsujimoto Electric Works, Co., Ltd.) was mounted on the surface of the light guide on which the arc-shaped prism pattern was formed as described above, and the prism sheet achieved was mounted on the smoothened surface serving as the light emission face of the light guide so that the surface on which the arc-shaped prism pattern of the prism sheet was formed corresponded to the light guide side and the corner portion located at the center of the arrangement of the arc-shaped prisms was overlapped with the notch portion of the light guide. Further, one LED light source in which the peak half-value width in the parallel direction to the light emission face of the light guide was equal to 115 degrees (±57.5 degrees) and the peak half-value width in the perpendicular direction to the light emission face of the light guide was equal to 115 degrees (±57.5 degrees) and the peak half-value width in the perpendicular direction was equal to 110 degrees (±55 degrees) was mounted at the notch portion of the light guide, and current of 15 mA was supplied.

Estimation

When the emission light distribution of the planar light source system thus achieved was measured, the half-value width (the expansion angle of the distribution when the luminance value is equal to a half of that of the peak emission light) was equal to 20 degrees in the radial direction of the arc-shaped prism pattern with the light source positioned at the center and to 10 degrees in the circumferential direction thereof. The luminance of the peak emission light was equal to 3000 cd/cm$^2$, and this was very high luminance value. Further, appearance of the planar light source system was excellent because it did not cause luminance unevenness.

EXAMPLE 2

A blast treatment using glass beads of 53 μm or less in particle size (FGB-400 produced by Fuji Manufacturing Works Co., Ltd.) was carried out on an effective area Z of 40 mm×30 mm on the surface of a mirror-polished SUS plate of 48 mm×34 mm in square and 3 mm in thickness under a blast pressure of 1.0 kgf/cm$^2$ while the distance from the SUS plate to a blast nozzle was set to 40 cm, thereby achieving a roughened-surface metal mold. Injection molding was carried out by using the roughened-surface metal mold thus achieved and the metal mold used in Example 1 on which the arc-shaped prism pattern was formed to achieve a rectangular light guide of 48 mm in long side length, 34 mm in short side length and 0.8 mm in thickness. Polymethylmethacrylate was used as the material of the injection molding.

In the light guide thus achieved, one surface thereof had a roughened surface having an average slant angle of 0.6 degree, and the arc-shaped prism pattern was formed on the other surface. A notch portion was formed at a corner portion of the light guide located at the center of the arrangement of the arc-shaped elongated prisms so that the notch portion had a flat surface having a length of 4 mm. Subsequently, the brass plate (having the average slant angle of 3.5 degrees) on which concave lenticular lenses were arranged in parallel to each other at a pitch of 100 μm was pressed against the notch face while the brass plate was heated, thereby forming a lens surface on which lenticular lenses extending in the thickness direction of the light guide were arranged in parallel to each other.

By using the light guide thus achieved and a light deflecting device on which an arc-shaped elongated prism pattern was formed in the same manner as Example 1 except that the prism faces were made flat, a planar light source system was formed in the same manner as Example 1, and the emission light distribution of the planar light source system thus formed was measured. The result showed that the half-value width was equal to 22 degrees in the radial direction of the arc-shaped prism pattern with the light source positioned at the center and to 27 degrees in the circumferential direction thereof. Further, the luminance of the peak emission light was equal to 1600 cd/cm$^2$, and this was a high value. Further, the appearance of the planar light source system was excellent because there occurred no luminance unevenness.

EXAMPLE 3

Radially elongated prisms each having an isosceles triangular cross section with an apex angle of 130 degrees were formed at an angular pitch of 30 degrees outside an effective area Z of 40 mm×30 mm on the mirror-polished surface of a brass plate of 48 mm×34 mm in square and 3 mm in thickness by cutting work so that they extend in the radial direction with the neighborhood of one corner of the rectangle of 48 mm×34 mm positioned at the center, thereby forming a metal mold having a radially elongated prism pattern. By using the metal mold having the radially elongated prism pattern thus achieved and the metal mold having the arc-shaped elongated prism pattern used in Example 1, injection molding was performed so that the center of the radially elongated prism pattern was coincident with the center of the arc-shaped prism pattern, and a rectangular light guide plate of 48 mm in long side length, 34 mm in short side length and 0.8 mm in thickness. Polymethylmethacrylate was used as the material of the injection molding.

The light guide thus achieved had one surface on which a radially elongated prism pattern as shown in FIG. 23F was formed and the other surface on which an arc-shaped prism pattern was formed. A notch portion having a flat surface having a length of 4 mm was formed at a corner portion of the light guide corresponding to the center of the arc-shaped elongated prisms.

A planar light source system was formed in the same manner as Example 1 by using the light guide thus achieved and the light deflecting device having the arc-shaped elongated prism pattern achieved in the same manner as Example 1. The emission light distribution of the planar light source system was measured, and the measurement result was that the half-value width was equal to 20 degrees in the radial direction of the arc-shaped prism pattern with the light source positioned at the center and to 18 degrees in the peripheral direction thereof. Further, the luminance of peak emission light was equal to 2000 cd/cm$^2$, and this was a sufficiently high luminance value. The appearance of the planar light source system was excellent with no unevenness of luminance.

COMPARATIVE EXAMPLE 1

Figure 32:
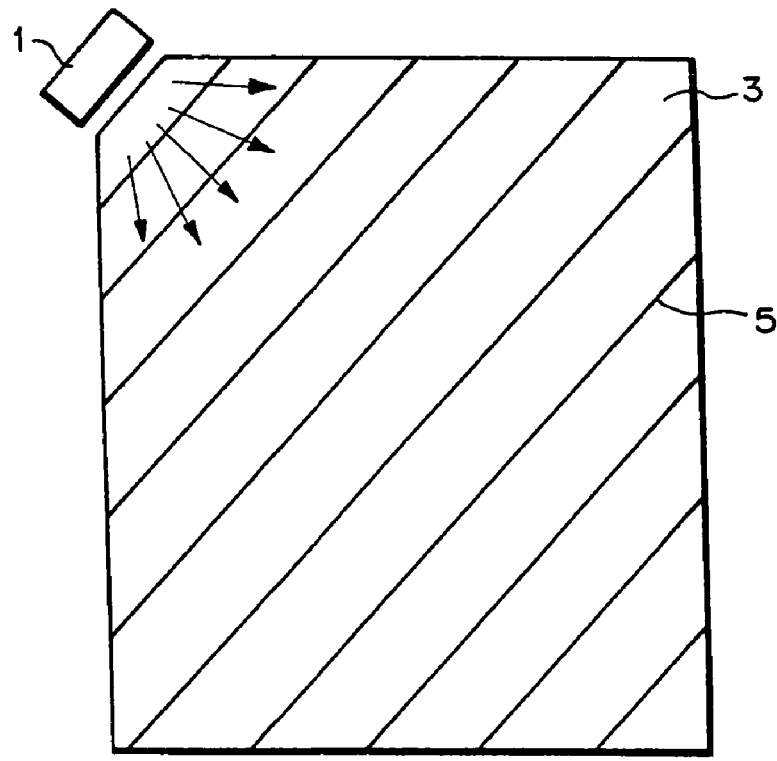
FIG. 32 is a diagram showing a pattern of elongated prisms of a light deflecting device as a comparative example of the present invention.

A prism pattern in which linear elongated prisms each having a substantially isosceles triangular cross section with an apex angle of 63 degrees, each of two prism faces defining the apex of each linear elongated prism being designed as a convex curved surface of 400 μm in radius of curvature, were arranged in parallel to each other at a pitch of 50 μm so as to be perpendicular to one diagonal line of a rectangle of 48 mm×34 mm on the mirror-polished surface of a brass plate of 48 mm×34 mm in square and 3 mm in thickness by a cutting work to achieve a metal mold. Thereafter, acrylic ultraviolet curable composition was poured into the metal mold thus achieved and a polyester film (A4000, refractive index of 1.600 produced by Toyobo Co., Ltd.) of 188 μm in thickness was laminated thereon. Thereafter, ultraviolet rays were irradiated through the polyester film by using a high-pressure mercury lamp to cure the acrylic ultraviolet curable composition, and then exfoliated from the metal mold to achieve a prism sheet. In the prism sheet thus achieved, on one surface of the polyester film was formed an elongated prism pattern made of ultraviolet curable resin of 1.528 in refractive index and having linear elongated prisms arranged at a pitch of 50 μm, each linear elongated prism having a substantially isosceles triangular cross section and having two prism faces which defined an apex angle of 63 degrees therebetween and was designed to have a convex curved surface having a radius of curvature of 400 μm as shown in FIG. 32.

A planar light source system was formed in the same manner as Example 1 except that the light deflecting device achieved was disposed on the light guide used in Example 1 so that the linear elongated prisms of the light deflecting device were arranged in the perpendicular direction to the diagonal line containing the center of the arc-shaped elongated prism pattern formed on the light guide. The emission light distribution of the planar light guide system was measured, and the result was that the half-value width was equal to 20 degrees in the radial direction of the arc-shaped elongated prism with the light source positioned at the center and to 10 degrees in the circumferential direction. The luminance of the peak emission light was equal to 3000 cd/cm$^2$, and this was a very high luminance value. With respect to the appearance of the planar light source system, the luminance was very high only in the diagonal line direction containing the light source and the peripheral portion was dark. That is, unevenness of luminance was remarkable.

INDUSTRIAL APPLICABILITY

According to the present invention, a light deflecting device is designed so that many elongated prisms are substantially arcuately arranged in parallel to each other on at least one surface thereof so as to surround the primary light source. Therefore, there can be provided a planar light source system using a substantially point-shaped light source such as an LED light source or the like, which is low in power consumption, compact in size, high in luminance and excellent in uniformity of luminance.

What is claimed is:

1. A planar light source system comprising:
   at least one primary light source of substantially point-shaped light source;
   a light guide having a light incident face on which light emitted from said primary light source is incident, guiding the incident light and having a light emission face from which the incident light is emitted; and
   a light deflecting device arranged above said light guide for controlling a direction of light emission from said light guide, wherein said primary light source is disposed at a corner portion or an end surface of said light guide, many substantially arc-shaped elongated lenses are formed in parallel to each other on at least one surface of said light deflecting device so as to surround said primary light source, and the corner portion of said light guide is notched to receive said primary light source.

2. The planar light source system as claimed in claim 1, wherein said light deflecting device has a light incident surface which confronts said light guide, and said substantially arc-shaped elongated lenses are formed on at least the light incident surface.

3. The planar light source system as claimed in claim 2, wherein each of said elongated lenses formed on said light deflecting device comprises an elongated prism having two prism faces, and light incident through at least one prism face is internally reflected and emitted from a light emission surface in a desired direction.

4. The planar light source system as claimed in claim 1, wherein said light deflecting device has elongated lenses formed on at least a light emission surface at the opposite side to a light incident surface confronting said light guide.

5. The planar light source system as claimed in claim 4, wherein said light deflecting device refracts light incident through the light incident surface and emits the light from the light emission surface in a desired direction.

6. The planar light source system as claimed in claim 1, wherein said light guide includes a structure having a refractive index different from that of a base material for said light guide.

7. The planar light source system as claimed in claim 1, wherein said elongated lenses formed on said light deflecting device face toward the light emission face of said light guide.

* * * * *